(12) United States Patent
Harris et al.

(10) Patent No.: US 10,642,663 B2
(45) Date of Patent: May 5, 2020

(54) COORDINATED GARBAGE COLLECTION IN DISTRIBUTED SYSTEMS

(71) Applicant: Oracle International Corporation, Redwood City, CA (US)

(72) Inventors: Timothy L. Harris, Cambridge (GB); Martin C. Maas, Berkeley, CA (US)

(73) Assignee: Oracle International Corporation, Redwood City, CA (US)

( * ) Notice: Subject to any disclaimer, the term of this patent is extended or adjusted under 35 U.S.C. 154(b) by 507 days.

(21) Appl. No.: 14/723,425

(22) Filed: May 27, 2015

(65) Prior Publication Data

US 2016/0070593 A1  Mar. 10, 2016

Related U.S. Application Data

(60) Provisional application No. 62/048,752, filed on Sep. 10, 2014.

(51) Int. Cl.
*G06F 9/52* (2006.01)
*G06F 11/34* (2006.01)
(Continued)

(52) U.S. Cl.
CPC .......... *G06F 9/522* (2013.01); *G06F 9/45558* (2013.01); *G06F 11/301* (2013.01);
(Continued)

(58) Field of Classification Search
CPC .... G06F 9/4843; G06F 9/45558; G06F 9/522; G06F 2009/45583; G06F 12/0253
See application file for complete search history.

(56) References Cited

U.S. PATENT DOCUMENTS 6,502,109 B1 * 12/2002 Aravamudan ........ G06F 9/4843
6,874,074 B1 *  3/2005 Burton ................ G06F 12/0269
                                                          707/999.202
(Continued)

OTHER PUBLICATIONS

Malte Schwarzkopf, et al., "Omega: flexible, scalable schedulers for large compute clusters". In EuroSys '13: Proc. 8th European Conference on Computer Systems, pp. 351-364, Apr. 2013.
(Continued)

*Primary Examiner* — Benjamin C Wu
(74) *Attorney, Agent, or Firm* — Robert C. Kowert; Kowert, Hood, Munyon, Rankin & Goetzel, P.C.

(57) ABSTRACT

Fast modern interconnects may be exploited to control when garbage collection is performed on the nodes (e.g., virtual machines, such as JVMs) of a distributed system in which the individual processes communicate with each other and in which the heap memory is not shared. A garbage collection coordination mechanism (a coordinator implemented by a dedicated process on a single node or distributed across the nodes) may obtain or receive state information from each of the nodes and apply one of multiple supported garbage collection coordination policies to reduce the impact of garbage collection pauses, dependent on that information. For example, if the information indicates that a node is about to collect, the coordinator may trigger a collection on all of the other nodes (e.g., synchronizing collection pauses for batch-mode applications where throughput is important) or may steer requests to other nodes (e.g., for interactive applications where request latencies are important).

20 Claims, 22 Drawing Sheets

(51) Int. Cl.
  *G06F 11/30* (2006.01)
  *G06F 9/455* (2018.01)
  *G06F 12/02* (2006.01)

(52) U.S. Cl.
  CPC .......... *G06F 11/34* (2013.01); *G06F 11/3409* (2013.01); *G06F 12/0253* (2013.01); *G06F 12/0276* (2013.01); *G06F 2009/45583* (2013.01); *G06F 2212/1024* (2013.01); *G06F 2212/152* (2013.01); *G06F 2212/154* (2013.01)

(56) References Cited

U.S. PATENT DOCUMENTS

| | | | |
|---|---|---|---|
| 8,719,432 B1* | 5/2014 | Vermeulen | G06F 9/526 707/704 |
| 2004/0107421 A1 | 6/2004 | VoBa et al. | |
| 2005/0033781 A1* | 2/2005 | Dussud | G06F 12/0269 |
| 2006/0143595 A1* | 6/2006 | Dostert | G06F 9/45504 717/127 |
| 2006/0248042 A1* | 11/2006 | Anna Janssens | G06F 12/0253 |
| 2007/0043935 A2 | 2/2007 | Kissell | |
| 2007/0074219 A1 | 3/2007 | Ginsberg | |
| 2007/0277056 A1* | 11/2007 | Varadarajan | G06F 11/1438 714/15 |
| 2008/0059712 A1 | 3/2008 | Fedorova | |
| 2008/0263535 A1* | 10/2008 | Dias | G06F 8/67 717/168 |
| 2009/0160867 A1 | 6/2009 | Grossman | |
| 2009/0165007 A1 | 6/2009 | Aghajanyan | |
| 2011/0072427 A1* | 3/2011 | Garmark | G06F 8/30 718/1 |
| 2012/0036309 A1* | 2/2012 | Dillow | G06F 11/108 711/103 |
| 2012/0227042 A1 | 9/2012 | Zedlewski et al. | |
| 2012/0233393 A1 | 9/2012 | Jiang et al. | |
| 2014/0143781 A1 | 5/2014 | Yao | |

OTHER PUBLICATIONS

Thomas Anderson, et al., Scheduler activations: Effective kernel support for the user-level management of parallelism. ACM Transactions on Computer Systems (TOCS), Feb. 1992, pp. 53-79, vol. 10, No. 1.

Juan A. Colmenares, et al., "Tessellation: refactoring the OS around explicit resource containers with continuous adaptation", In DAC '13: Proc. 50th Annual Design Automation Conference, Jun. 2013, pp. 76:1-76:10.

Tim Harris, et al., "Callisto: Co-Scheduling Parallel Runtime Systems", EuroSys '14, 2014, pp. 1-15.

Allan Snavely, et al., "Symbiotic Jobscheduling with Priorities for a Simultaneous Multithreading Processor", ASPLOS IX, 2000, pp. 234-244, ACM, New York, NY, USA.

James R. Bulpin; et al., "Hyper-Threading Aware Process Scheduling Heuristics", Proceedings of the 2005 USENIX Annual Technical Conference, 2005, pp. 399-402, USENIX Association, Berkeley, CA, USA.

Rob Knauerhase; et al., "Using OS observations to improve performance in multicore systems", IEEE Micro, 28(3), May 2008, pp. 54-66.

Yuejian Xie, et al., "Dynamic classification of program memory behaviors in CMPs", Proceedings of CMP-MSI, Jun. 2008, pp. 1-9.

Sergey Zhuravlev; et al., "Addressing Shared Resource Contention in Multicore Processors via Scheduling", In the proceedings of the Fifteenth Edition of ASPLOS on Architectural Support for Programming Languages and Operating Systems, 2010, pp. 129-142, New York, NY, USA.

Lingjia Tang, et al., "The Impact of Memory Subsystem Resource Sharing on Datacenter Applications", In Proceedings of the 38th Annual International Symposium on Computer Architecture, ISCA '11, 2011, pp. 283-294, ACM, New York, NY, USA.

Simone Libutti, et al., "Exploiting Performance Counters for Energy Efficient Co-Scheduling of Mixed Workloads on Multi-Core Platforms", In Proceedings of Workshop on Parallel Programming and Run-Time Management Techniques for Many-core Architectures and Design Tools and Architectures for Multicore Embedded Computing Platforms, PARMA-DITAM '14, 2014, pp. 27:27-27:32, ACM, New York, NY USA.

Malte Schwarzkopf, et al., "Omega: flexible, scalable schedulers for large compute clusters", In EuroSys '13: Proc. 8th European Conference on Computer Systems, Apr. 2013, pp. 351-364.

Thomas Anderson, et al., "Scheduler activations: Effective kernel support for the user-level management of parallelism", ACM Transactions on Computer Systems (TOCS), vol. 10, No. 1, Feb. 1992, pp. 53-79.

Robert L. McGregor; et al., "Scheduling Algorithms for Effective Thread Pairing on Hybrid Multiprocessors", In Proceedings of the 19th IEEE International Parallel and Distributed Processing Symposium (IPDPS), 2005, pp. 1-10, Los Alamito, CA, USA.

Mohammad Banikazemi; et al., "Pam: A novel performance/power aware meta-scheduler for multi-core systems", In Proceedings of the 2008 ACM/IEEE Conference on Supercomputing, SC '08, Nov. 15-21, 2008, pp. 1-12, Piscataway, NJ, USA.

\* cited by examiner

COORDINATED GARBAGE COLLECTION IN DISTRIBUTED SYSTEMS

This application claims benefit of priority of U.S. Provisional Application Ser. No. 62/048,752 entitled "Coordinated Garbage Collection in Distributed Systems," filed Sep. 10, 2014, the content of which is incorporated by reference herein in its entirety.

BACKGROUND

Large software systems often include multiple virtual machine instances (e.g., virtual machines that adhere to the Java® Virtual Machine Specification published by Sun Microsystems, Inc. or, later, Oracle America, Inc., which are sometimes referred to herein as Java® Virtual Machines or JVMs) running on separate host machines in a cluster and communicating with one another as part of a distributed system. The performance of modern garbage collectors is typically good on individual machines, but may contribute to poor performance in distributed systems.

In some existing systems, both minor garbage collections (e.g., garbage collections that target young generation portions of heap memory) and major garbage collections (e.g., garbage collections that target old generation portions of heap memory) are "stop the world" events. In other words, regardless of the type of collection being performed, all threads of any executing applications are stopped until the garbage collection operation is completed. Major garbage collection events can be much slower than minor garbage collection events because they involve all live objects in the heap.

Some workloads involve "barrier" operations which require synchronization across all of the machines. That is, if any one machine is delayed (e.g., performing garbage collection) then every other machine may have to wait for it. The impact of this problem may grow as the size of the cluster grows, harming scalability. Other workloads, such as key-value stores, may involve low-latency request-response operations, perhaps with an average-case delay of 1 millisecond (exploiting the fact that a modern interconnect, such as one that adheres to the InfiniBand™ interconnect architecture developed by the InfiniBand® Trade Association, may provide network communication of the order of 1-2 μs). A single user-facing operation (e.g., producing information for a web page) may involve issuing queries to dozens of key-value stores, and so may be held up by the latency of the longest "straggler" query taking 10 or 100 times longer than the average case. Young-generation garbage collection may also be a source of pauses which cause stragglers, even when using an optimized parallel collector.

SUMMARY

Many software systems comprise multiple processes running in separate Java Virtual Machines (JVMs) on different host machines in a cluster. For example, many applications written in the Java™ programming language (which may be referred to herein as Java applications) run over multiple JVMs, letting them scale to use resources across multiple physical machines, and allowing decomposition of software into multiple interacting services. Examples include popular frameworks such as the Apache® Hadoop framework and the Apache® Spark framework. The performance of garbage collection (GC) within individual virtual machine instances (VMs) may have a significant impact on a distributed application as a whole: garbage collection behavior may decrease throughput for batch-style analytics applications, and may cause high tail-latencies for interactive requests.

In some embodiments of the systems described herein, coordination between VMs, enabled by the low communication latency possible on modern interconnects, may mitigate the impact of garbage collection. For example, in some embodiments, fast modern interconnects may be exploited to control when garbage collection is performed on particular ones of the nodes (e.g., VMs) of a distributed system in which separate, individual processes communicate with each other and in which the heap memory is not shared between the nodes. These interconnects may be exploited to control when each of the VMs perform their garbage collection cycles, which may reduce the delay that pauses to perform garbage collection introduce into the overall performance of the software or into the latency of particular individual operations (e.g., query requests).

In various embodiments, a garbage collection coordination mechanism (e.g., a garbage collection coordinator process) may obtain (e.g., through monitoring) and/or receive state information from each of the nodes and apply a garbage collection coordination policy to reduce the impact of garbage collection pauses, dependent on that information. For example, if, while executing a batch-mode application in which the overall throughput of the application is a primary objective, the information indicates that a node is about to collect, the coordinator may trigger a collection on all of the other nodes, synchronizing collection pauses for all of the nodes. In another example, if, while executing an interactive application that is sensitive to individual request latencies, the information indicates that a node is about to collect, the coordinator may steer requests to other nodes, steering them away from nodes that are performing, or are about to perform, a collection.

In some embodiments, the garbage collection coordinator process may be implemented as a dedicated process executing on a single node in the distributed system. In other embodiments, portions of the garbage collection coordinator process may be distributed across the nodes in the distributed system to collectively provide the functionality of a garbage collection coordinator. In some embodiments, multiple garbage collection coordination policies may be supported in the distributed system, including, but not limited to, one or more policies that apply a "stop the world everywhere" approach, and one or more policies that apply a staggered approach to garbage collection (some of which make use of a limited number of tokens to control how many nodes can perform garbage collection at the same time).

In various embodiments, a GC-aware communication library and/or GC-related APIs may be used to implement (and/or configure) a variety of mechanisms for performing coordinated garbage collection, each of which may reduce the impact of garbage collection pauses during execution of applications having different workload characteristics and/or performance goals.

Figure 1:
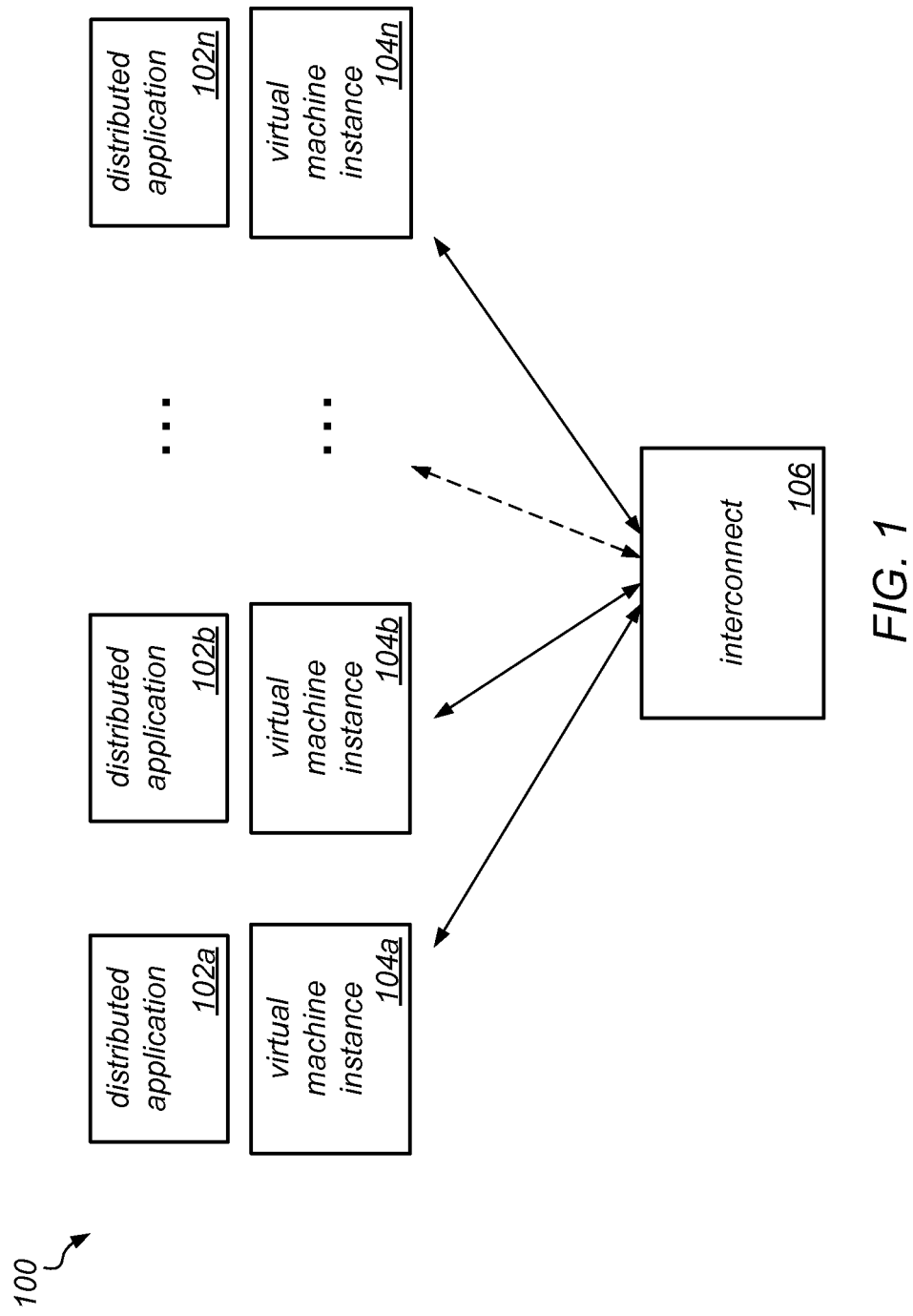
FIG. 1 is a block diagram illustrating a distributed system, according to one embodiment.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As noted above, many software systems comprise multiple processes running in separate Java Virtual Machines (JVMs) on different machines in a cluster. For example, many Java applications run over multiple JVMs, letting them scale to use resources across multiple physical machines, and allowing decomposition of software into multiple interacting services. Examples include popular frameworks such as the Hadoop framework and the Spark framework.

As described in more detail herein, the performance of garbage collection (GC) within individual virtual machine instances (VMs) can have a significant impact on a distributed application as a whole. For example, garbage collection behavior can decrease throughput for batch-style analytics applications, and can cause high tail-latencies for interactive requests.

In some embodiments of the systems described herein, fast modern interconnects (such as those in Oracle® Engineered Systems) may be exploited to control when the separate JVMs perform their garbage collection cycles, which may reduce the delay that these introduce to the software's overall performance. For example, they may be exploited to synchronize collection pauses so that they occur at the same time, or to steer requests away from JVMs that are currently paused for collection, in different embodiments. In other words, coordination between VMs, enabled by the low communication latency possible on modern interconnects, may (in at least some embodiments) mitigate problems that can occur when performing uncoordinated garbage collection operations. For example, the use of coordinated garbage collection, as described herein, may reduce the impact of garbage collection pauses in a batch workload, and may reduce the extent to which garbage collection causes "stragglers" in interactive settings.

While the features, techniques and methods of coordinated garbage collection are described herein mainly in terms of systems based on the Java programming language, they may also be applicable in other distributed systems that employ garbage collection (such as those built over the Microsoft® .NET™ framework) and to distributed systems in which nodes may need to pause temporarily for other activities (e.g., not necessarily garbage collection), according to various embodiments. For example, "housekeeping" activities within an application itself (such as resizing a hash table, or restructuring a software-managed cache) or system activities (such as virtual machine live migration) may also be coordinated using the techniques described herein.

Some existing methods for preventing long latencies related to garbage collections may include:
- Using C/C++ instead of Java for latency-sensitive applications (e.g., application having interactive workloads). For example, the Apache® Cassandra™ key-value store from the Apache Software Foundation (originally developed at Facebook, Inc.) may utilize this technique.

Writing code in contorted ways to avoid allocating memory (and hence the need for garbage collection), e.g., representing data within a single large array of bytes, rather than as separate objects.

Setting heap sizes to prevent garbage collection from ever occurring, and restarting an application periodically to avoid performing garbage collection (e.g., restarting a trading application at the beginning of each day). Note, however, that this approach may involve inefficient use of resources. Note also that this approach may fail if the heap size is reached on a day on which the application experiences an unexpectedly large workload.

In latency-sensitive workloads, duplicating requests to multiple servers, and picking the first response (e.g., hoping that there will be at most one straggler amongst these requests). Note that duplicating requests may also involve inefficient use of resources.

As shown above, some attempts to mitigate straggler problems may involve replicating work (at the cost of poor resource utilization), or changing code to avoid performing allocation at all (at the cost of poor software engineering, a reduction in the adoption of Java, or fragile performance, e.g., working in some cases, but failing unexpectedly).

Modern cluster interconnects may allow processes to communicate at a much lower latency than the start/end of activities such as garbage collection (even young-generation collection). In some embodiments, coordinated garbage collection in distributed systems may take advantage of modern cluster interconnect communication to reduce the impact that activities such as garbage collection have on the overall performance of the application. For example, in some embodiments, requests may be steered away from a process that is about to perform garbage collection.

In general, the systems and techniques described herein for performing coordinated garbage collection may improve the performance of distributed Java applications, in at least some embodiments. Additionally, when developing software for systems that implement coordinated garbage collection, programmers who might otherwise have chosen to write their software in C/C++ may instead choose to write it in Java.

INTRODUCTION

As described herein, it has been demonstrated that systems software and language runtime systems may be able to evolve in a manner that better supports "rack scale" machines in which tightly-coupled sets of machines are deployed and used together as a single system. In some cases, rack-scale systems (including some that have been developed as university research projects) may include specialized processors, storage devices, and/or interconnects. These systems may blur the boundaries between "distributed systems" and "single machines." For example, in various embodiments, they may exhibit one or more of the following features: (i) hardware may be designed and provisioned together, (ii) components such as power supplies and storage arrays may be shared across machines, (iii) IO devices may be accessed across an internal fabric rather than being attached directly to processor motherboards, and (iv) message passing within the system may be more reliable (e.g., as compared to traditional networking), and interconnect latencies may be low (e.g., sub-µs on research systems, and few-µs on commodity hardware).

As described in more detail herein, the performance of distributed Java applications running on multiple nodes in a rack-scale cluster (e.g., with and without support for coordinated garbage collection) has been investigated. For example, some of the coordinated garbage collection techniques described herein have been applied in investigations into whether low latency interconnects may enable useful coordination between language runtime systems at the rack-level (e.g., distributed Java applications running on multiple nodes in a rack-scale cluster), as has been hypothesized. As described herein, it has been demonstrated that low latency interconnect communication may be exploited to reduce the impact of the garbage collection on an application's performance. For example, in some embodiments, low latency interconnect communication may improve performance of Java-based systems that involve "big data" analytics workloads (e.g., without having to rewrite them in C/++ in order to avoid garbage collection latencies).

Some preliminary results of the application of coordinated garbage collection techniques are described herein in reference to two particular issues that were examined: (i) pauses in batch computations caused by software on one machine trying to synchronize with software on another machine that is currently stopped for garbage collection, and (ii) latency spikes in interactive workloads caused by one or more garbage collections coinciding with the handling of a request. More specifically, various features, methods, and/or techniques for implementing coordinated garbage collection are described herein in reference to two example systems: a batch-mode system (e.g., one that implements a Spark framework) on which the PageRank graph computation is executed, and a distributed NoSQL data management system (e.g., an Apache Cassandra database system). As demonstrated using these example systems, the introduction of these features, methods, and/or techniques to provide coordination between JVMs may mitigate at least some of the problems related to garbage collection latencies.

In a batch workload, any application-wide synchronization may have to wait if any of the processes involved has stopped for garbage collection. In other words, a garbage collection on a single machine may stall the entire distributed application. In some embodiments of the systems described herein, the use of a "stop the world everywhere" policy, in which the garbage collections across all of the processes may be forced to occur at the same time, may address (or mitigate) this issue.

In an interactive workload, an individual request's latency may be negatively impacted if a garbage collection occurs while it is being serviced. In some embodiments of the systems described herein, the use of heap-aware work distribution, in which requests may not be sent to machines if (and when) they are about to pause for collection, may address (or mitigate) this issue. In some embodiments, the replication of data in the system (which may already be utilized for robustness) may be exploited to redirect requests to another machine that is not paused (and that is not about to pause) to perform garbage collection.

In some ways, the two techniques described above (e.g., the "stop the world everywhere" technique and heap-aware work distribution) may be considered instances of a single, more general, technique for coordinating garbage collection in various target systems.

Some existing garbage collection algorithms perform well for single-machine (e.g., non-distributed) workloads. Other previous work on distributed garbage collection has been focused on systems and scenarios in which one large application is running across multiple JVMs, the data for the application is spread across the individual machines, and there is a single shared heap for all of the machines. In these systems and scenarios, there may be pointers from the objects on one machine to objects on another machine, with the primary challenges for the distributed garbage collector being determining which objects can be de-allocated and determining how to handle cycles of references between objects on two machines. For example, various distributed garbage collection techniques for heaps that span multiple machines are described in "Garbage Collection", by R. Jones and R. Lins, published by John Wiley & Sons Ltd., New York, 1996.

In contrast to these earlier approaches, the systems and methods for implementing coordinated garbage collection described herein may be applied to distributed systems in which the application itself is distributed, e.g., in systems in which each computing node in the distributed system runs in its own separate virtual machine instance (e.g., in its own separate JVM) and has its own heap memory (as opposed to the computing nodes or virtual machine instances sharing a single, distributed heap). More specifically, coordinated garbage collection, as described herein, may be well suited for application in systems in which a distributed application is executing on multiple virtual machine instances (e.g., multiple virtual machine instances, each of which is hosted on a respective physical computing node) and in which the distributed application includes frequent communication between the nodes. In some embodiments, the physical computing nodes on which the virtual machine instances are hosted may be components of a rack-scale machine, and may be connected to each other over a low latency interconnect such as an InfiniBand interconnect or a fast Ethernet network (e.g., one with a latency of a few microseconds).

One example of a distributed system to which coordinated garbage collection may be applied is illustrated in FIG. 1, according to at least some embodiments. In this example, a distributed system 100 includes multiple virtual machine instances, shown as virtual machines instances 104a-104n, that communicate with each other over interconnect 106. Note that, in some embodiments, each virtual machine instance may be hosted on a different physical computing node, while in other embodiments, two or more of such virtual machine instances may be hosted on the same one of multiple physical computing nodes. In this example, different portions of a distributed application (shown as 102a-102n) are executing on each of the virtual machine instances 104a-104n.

In this type of distributed system, the virtual machine instances (e.g., JVMs) may be completely separate machines running separate, individual processes. Here, the heap may not be shared across the machines. Instead, in some embodiments of the systems described herein, the timing of the garbage collections performed on the individual machines may be controlled, and the timing of the garbage collections may be coordinated in a manner that mitigates the impact of those garbage collections on the performance of the complete distributed application as a whole. In other words, the techniques described herein may be directed to improvements in "garbage collection for distributed systems" rather than in "distributed garbage collection" (as in previous work). As described in more detail below using two example case studies, these techniques may be applied to applications that have very different workloads. The performance improvements achieved in these two (very different) case studies demonstrate that performance improvements due to the application of these techniques may be expected in the general case, in other embodiments.

In the type of distributed system to which the coordinated garbage collection techniques described herein are targeted (e.g., those in which the virtual machine instances are separate machines running separate, individual processes that communicate with each other and in which the heap memory is not shared across the machines), it may be common for one of the following two recurring problems to occur, depending on the workload: decreased throughput of applications or spikes in tail-latencies.

Decreased Throughput of Applications.

Distributed applications often must perform operations to implement synchronization between the different nodes. For example, they may be synchronized through the use of distributed barriers or locks, or software running on one node may need to wait for a response to a message it has sent to another node. In such application, if a garbage collection pause occurs on a node that is holding a lock or that has not yet reached a barrier, all other nodes may be stalled waiting for the garbage collection to finish. This problem may become more significant (in terms of its effect on the overall performance of the application) as the number of nodes in a system increases. For example, in some embodiments, even if the percentage of time that a given node is garbage collecting remains fixed, as the number of nodes in a system increases, the percentage of time that at least one such node is garbage collecting may increase.

Spikes in Tail-Latencies.

Interactive workloads may be expected to serve requests within time frames that are shorter than typical garbage collection pauses (such as <0.5 ms). Some examples of software applications that exhibit these workloads include web servers, key value stores, web caches, and so on. In many cases, these workloads have a large fan-out, meaning that a request to one server may cause a cascade of requests to additional servers whose responses are combined to form a result. Consequently, the overall performance of a request may be dependent on the slowest server that is contacted. Once again, the problem may become more significant as the number of VMs grows.

Typically, to avoid the issues of decreased throughput and tail-latency spikes, programmers may either (i) avoid Java for these interactive workloads, (ii) use unusual programming idioms to avoid garbage collection (e.g., keeping data in large scalar arrays), (iii) perform most computations in C/C++ code accessed through a native interface, such Java Native Interface (JNI), or (iv) over-provision machines (e.g., with enough physical memory to avoid the need to garbage collect at all) and/or utilize other ad hoc practices (e.g., restarting a trading application every day) to avoid collection while an application is active.

While the impact of garbage collection pauses may, in some circumstances, be mitigated by using concurrent or incremental collectors, such as concurrent mark sweep (CMS) or garbage-first (G1) collectors, in practice, developers often opt for "stop the world" collectors due to their high throughput (e.g., at least for major collections). For instance, the throughput achieved by concurrent collectors may be insufficient to keep up with allocation for very large heaps. Furthermore, the performance overhead of memory barriers required by concurrent collectors may decrease the effective performance of mutator threads.

In some embodiments of the systems described herein, rather than trying to avoid "stop the world" pauses, garbage collection pauses may be coordinated across multiple nodes in order to avoid them affecting an application's overall performance. For example, for batch workloads, computations may span multiple garbage collection cycles. When utilizing coordinated garbage collection, the impact of garbage collection on the application as a whole may be no worse than the impact on an individual machine (e.g., rather than incurring decreased performance with additional machines, even when the rest of the application scales well). In some embodiments, when utilizing coordinated garbage collections for interactive workloads, where computations may be much smaller than inter-GC periods, response times may not be affected by garbage collection at all.

As noted above, the features, techniques and/or methods of coordinated garbage collection described herein may be utilized with any of various types of systems. For instance, one example system on which some of the experiments described herein were executed was a cluster comprising 2-socket machines with processors running at 2.6 GHz. Each socket had 8 cores, each of which implements 2 hardware contexts, for a total of 32 hardware contexts per machine. Each machine included 128 GB RAM, and all of the machines were connected via a high throughput network communications link. In this example embodiment, the experiments used between 8 and 16 machines and using JVM with default settings, running on the Linux™ operating system.

For these experiments, in order to demonstrate the features of coordinated garbage collection, a set of scripts (in this case, written in the Python programming language) were developed and utilized to initialize workloads on the cluster. In this example embodiment, the scripts were designed to take a general description of a workload and run it across a set of machines, enabling the pinning of each workload to specific nodes of the cluster, and to specific cores within each machine.

In some embodiments, including in the example system used in the experiments, additional features may be added. For example, these additional features may be useful for bringing up composite workloads (e.g., waiting for certain services to come up), determining the servers associated with a particular service, and/or shutting down all services cleanly at the end of a run. In various embodiments, including in the example system used in the experiments, such scripts may be used to bring up the components of a specific setup (e.g., Hadoop, Hive, Spark, or Shark frameworks, and applications running on top of them) one after another, automatically populate them with the correct data, and run benchmarks against them. As described herein, such scripts may also be used to run a garbage collection coordinator on all the nodes, connect it to the JVMs spawned by the different workloads and collect the data in a central location (e.g., for collecting and reporting of GC-related latency data).

Various problems associated with traditional garbage collection techniques in distributed workloads may be demonstrated using a computation to rank websites within search engine results (e.g., a PageRank computation) using a data analytics cluster computing framework (e.g., the Spark computation framework, which was originally developed at UC Berkeley and is now part of the Apache computation ecosystem).

Workload Overview.

The Spark framework is based around distributed data structures called "Resilient Distributed Datasets", which support general MapReduce-style operations on distributed data (such as filter or map operations) but enable iterative computation without having to materialize data between steps. On the Spark Framework, this may be achieved through keeping track of transformations that were performed on the data. In the case of a node failure, the data on the node may be reconstructed from the last materialized version by performing the same transformations again.

One type of problem associated with traditional garbage collection in distributed workloads has been demonstrated using in-memory computations on a big data set. More specifically, distributed 8-node PageRank computations were performed on a 56 GB web page dump. In experiments performed as part of this demonstration, each PageRank step consisted of three phases that the nodes performed independently, with all-to-all communication taking place at the end of each phase. The end of each phase effectively acted as a cluster-wide barrier, with no node being able to continue execution until all nodes finished that phase. With these types of workloads, load balancing may be important. Thus, a partitioning mechanism that spreads different parts of the graph evenly across nodes (one that was provided by the execution framework) was utilized, in these experiments.

In contrast to domain-specific language (DSL) frameworks for graph data analysis (such as Green-Marl), a data analytics cluster computing framework, such as Spark, may not be specialized for performing graph computations, but may be used for many different workloads, including Machine Learning workloads or workloads that involve serving SQL Queries. While the graph performance of a data analytics cluster computing framework may not be competitive with specialized graph data analysis frameworks, the underlying patterns of cluster-wide synchronization may apply to other frameworks.

In a first example, a long-running computation having a lot of communication between the processes on separate machines was run over a Spark framework. In this example, at regular intervals during the communication, all of the machines needed to synchronize with one another, and as each of the machines reaches the synchronization point, they are stalled (i.e., none of them can proceed) until all of the machines reach the synchronization point. In other words, all of the machines are held up if any one of them is delayed in reaching the synchronization point. By observing the interaction of the Spark framework with the garbage collector, it was determined that if garbage collection executes on one of the machines in between two of these synchronization points that garbage collection will delay the threads running on that machine, which in turn delays the threads running on the other machines (because they are being held up waiting for the synchronization to occur). In this example, even if the programmer who has written the application has designed it to scale well as machines are added to the system, as extra machines are added, the likelihood that any one of the machines stops to do garbage collection at any given time goes up. For example, if there are 1000 machines, it becomes very likely that, at any given instance, at least a handful of them are going to be stopped to perform garbage collection, and even one garbage collection operation being executed on one machine can hold up all of the other machines. In this manner, the garbage collection may harm the scalability of the application as a whole.

More specifically, this first example illustrates the impact of garbage collection utilizing the PageRank benchmark with default garbage collection settings (e.g., parallel GC settings). The benchmark was set to run a large number of supersteps (iterations). Note that the default number of supersteps may be on the order of 10, which may or may not be sufficiently long-running to reach steady-state JVM performance. Therefore, in this example, the Spark framework was configured to keep all data in memory as intended (although in other embodiments, the Spark framework may use its own algorithm to write temporary data out to disk, in which case the disk performance may dwarf other factors).

In this example, a heap size of 64 GB was used for the master and driver, and a heap size of 32 GB for spawned Spark executors (which may be considered the components performing the most work).

In this example, the PageRank computation ran for 30 supersteps and recorded the time that each of the supersteps took to execute. A profile analysis of the PageRank supersteps that required a synchronization barrier across the distributed system and the points at which a full garbage collection was performed on a particular node being profiled illustrated the effects of performing a garbage collection run in the middle of a superstep, with one runnable task locally. The analysis showed that, after a long loading phase that stresses the file system, there may be significant variation in the duration of each superstep. For example, while many steps completed in about 11 s, others took up to 28 s. In some cases, it appeared that the variation in the duration of each superstep may be due to work "stalling" across the system when any one (or more) of the nodes is performing a full collection. Using an analysis that examined the amount of work on each of two different nodes (e.g., the number of tasks to complete), along with the start/finish times of the collections, it was demonstrated that a full garbage collection pause on either of these machines tended to coincide with a lack of work on the other machine. For example, the first node was without work while the second node was in its first full garbage collection pause, and vice versa.

Figure 2:
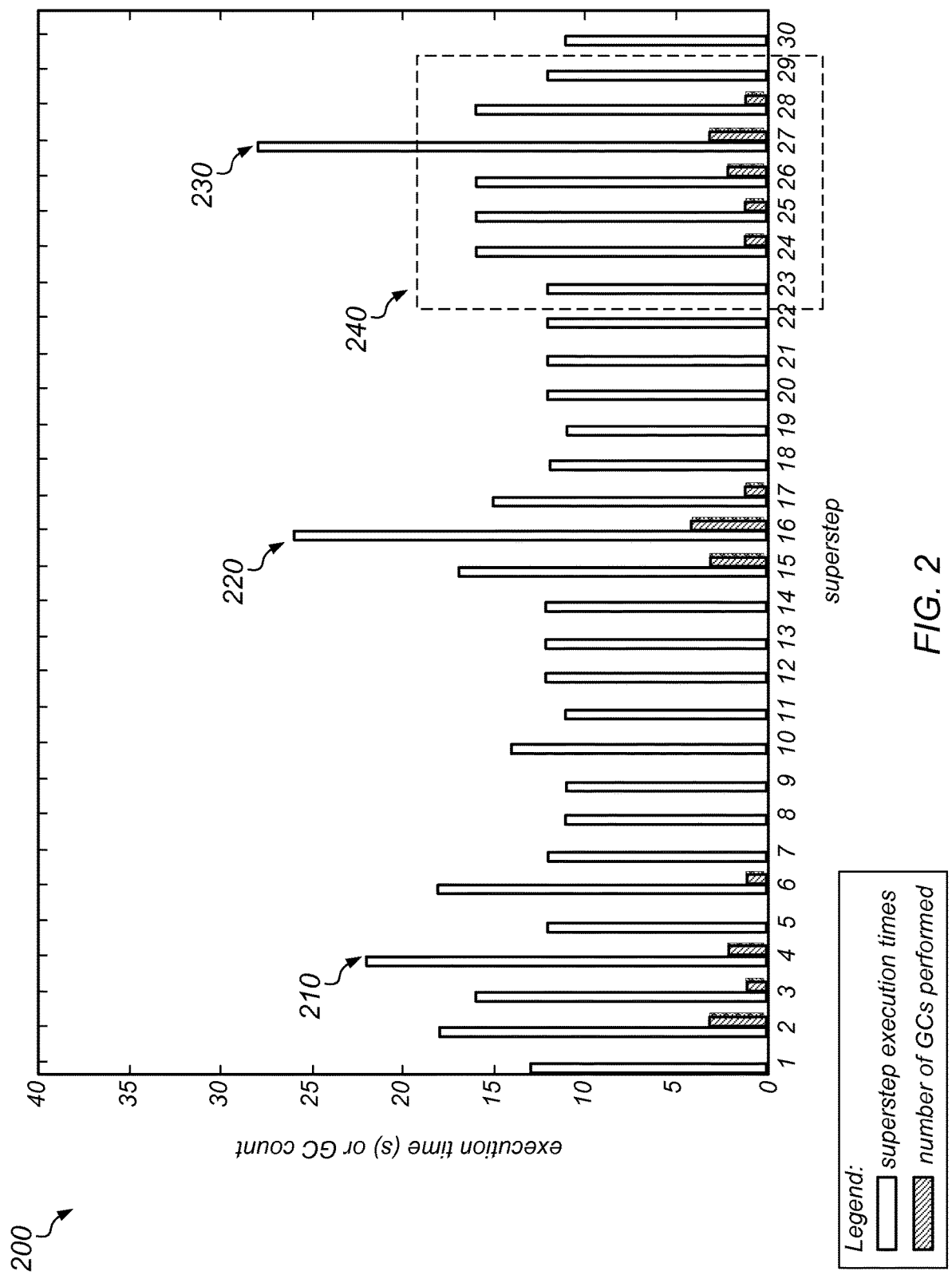
FIG. 2 is a graph illustrating the duration of each superstep of a benchmark distributed application and the number of garbage collection operations on any node occurring during each superstep.

FIG. 2 is a graph illustrating the duration of each superstep of a benchmark distributed application and the number of garbage collection operations that are performed on any node during each superstep in a system that does not implement garbage collection coordination. More specifically, the unfilled bars in graph 200 illustrate the execution times (in seconds) of each superstep of a PageRank algorithm (e.g., they illustrate the lengths of the intervals between pairs of synchronization points during execution of the benchmark), while the hashed bars indicate the number of nodes, if any, that performed a full garbage collection during each superstep.

As shown in FIG. 2, supersteps that do not include garbage collection operations may have relatively low runtimes (e.g., all supersteps that do not include any garbage collection operations take roughly the same amount of time, in this example). However, if and when a garbage collection operation occurs on any node, this may significantly increase the runtime of a superstep. Here, the delays are largely due to garbage collection operations causing some machines to stall (i.e., while waiting for the collection operations to complete). For example, while most supersteps took approximately 12 seconds to complete, bars 210, 220, and 230 indicate that supersteps 4, 16, and 27, respectively, took much longer than this (e.g., approximately 22 seconds, 26 seconds, and 28 seconds, respectively). In other words, the highest peaks occurred when garbage collection operations were happening on a large number of nodes. As shown by the supersteps within dashed area 240, clumps of garbage collection activities may be spread out over time, impacting multiple supersteps. Note that when garbage collection did occur, in this example, the delays were generally proportional to the number of collections that took place in the superstep. Note also that any individual collection operation (anywhere in the system) can stall the entire application and harm performance, even though it occurs only on a single machine.

As described herein, there may be different garbage collection issues associated with different types of workloads. For example, some of the problems associated with garbage collection in interactive applications may be demonstrated using a distributed database management system, such as an Apache Cassandra database system. As used herein, the term "interactive" may refer to an application that makes low-latency responses to network requests (e.g., as opposed to a desktop application).

A NoSQL database, such as an Apache Cassandra database, may be optimized for low query latencies and scalability to large numbers of nodes. As such, it may serve as an example of a distributed, latency-sensitive workload. More specifically, this database uses consistent hashing to map each data row to a set of nodes in a cluster which store replicas of that data. A client can send a request to any node within a cluster (e.g., the node to which a request is sent is not necessarily one that is holding the requested data). That node may then act as the coordinator for the request, and may forward it to the nodes holding replicas of the data. The coordinator may respond to the client once replies are received from a quorum of replicas. For example, some of the experiments described herein use a replication factor of three nodes (meaning that the system holds three replicas for each data element, one on each of three different nodes), and a quorum size of two (meaning that two of the three nodes holding a replica of a given data element must return the same information in order to return a valid response to the requestor).

Figure 3:
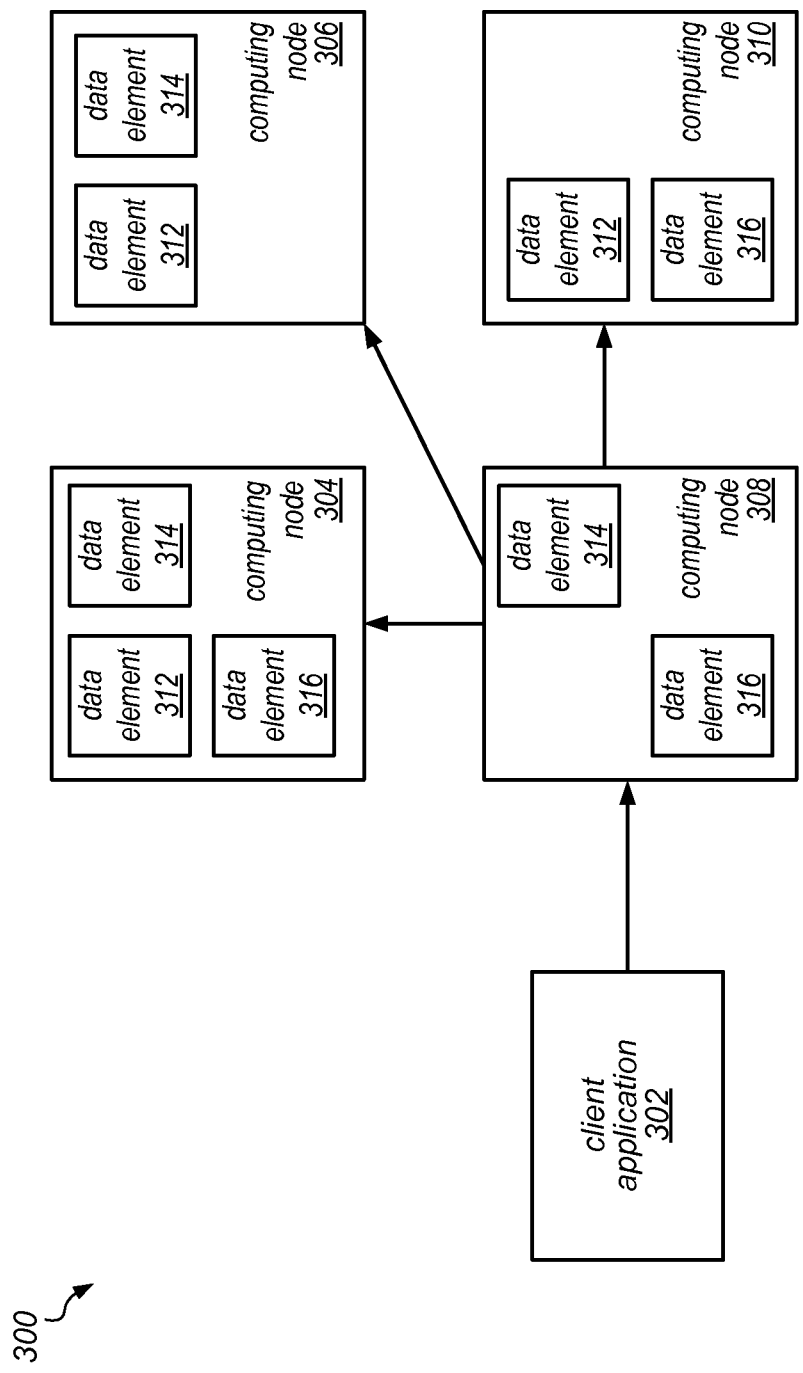
FIG. 3 is a block diagram illustrating an example database system including a four node cluster, according to one embodiment.

One example database system (e.g., a NoSQL database system) that includes a four node cluster is illustrated by the block diagram in FIG. 3, according to at least some embodiments. In this example, the data maintained in database system 300 is three-way replicated. Here, a client may contact any node in the cluster (i.e., a node that may or may not hold the requested data), and the contacted node contacts one or more of the nodes that hold replicas of the requested data. In this example, computing node 304 holds data items 312, 314, and 316; computing node 306 holds data items 312 and 314; computing node 308 holds data items 316 and 314; and computing node 310 holds data items 312 and 316. In this example, a client application 302 (e.g., a benchmark application described below) may contact computing node 308 to communicate read and/or update requests, and computing node 308 may pass at least some of those requests to other ones of the computing nodes that hold the requested data.

This example database system (which may implement a key-value store) may experience a workload in which the latency of individual requests is more important (e.g., to the client) than the overall throughput of the server. This workload may be representative of many different server workloads in which the server is receiving requests and making responses to clients, and in which the server must be able to supply responses quickly and within a predictable amount of time (e.g., with 99% of responses being provided within 1 millisecond, according to an applicable service level agreement). Note that this workload (and the expectations on the server performance for this workload) are quite different from those of the previous example. For example, in the previous case, a goal was to coordinate the old generation garbage collections. These are typically the longest types of pauses that are introduced due to garbage collection. For example, in some settings, these may last 5-10 seconds or longer (which may be multiple orders of magnitude longer than the young generation garbage collection pauses that are experienced in this second example (which may take on the order of 1 millisecond or 10 milliseconds). Note that young generation garbage collection pauses may be short enough that they do not significantly impact the overall performance of an interactive application executing on a desktop machine, but they may be significant in a server that is bound by an agreement to respond to requests within a period of time that is much shorter than the time it takes to perform garbage collection.

In some embodiments, the systems described herein may exploit the fact that, in this type of distributed system, the client application (such as client application 302 in FIG. 3) is able to contact any one of the server machines (shown as computing nodes 304, 306, 308, and 310) and the data that the client is accessing is replicated across multiple ones of these server machines. Here, if the client wants to access a particular data element, it could send a request to any of the four server machines, and that server machine (if it does not hold the requested data element) would forward the request on to one that holds the requested data element. For example, if the client wants to access data element 312, it could send a request to computing node 308 (even though it does not hold data element 312), and computing node 308 would forward the request on to one of the machines that holds data element 312 (e.g., computing node 304, 306, or 310). Note that, in some cases, the client may choose to send the request to a particular one of the servers that holds the requested data item, if it is possible to identify them. In some embodiments of the systems described herein, the latency of individual requests may be improved by avoiding contacting a server that is performing a garbage collection or that is about to pause to perform garbage collection. In such embodiments, when there is no garbage collection happening on a particular server that holds the requested data, the server may be able to reply reliably within a small time interval (e.g., within a 1 millisecond interval for the vast majority of requests). In such embodiments, as long as the client is able to avoid the servers that might be paused (e.g., for 10 milliseconds) to perform a garbage collection, then the client may not observe the effects of that garbage collection.

It is hypothesized that, for workloads such as these, a request may be delayed if (i) the coordinator pauses for garbage collection while handling the request, or (ii) so many nodes pause for garbage collection while handling the request that the coordinator does not receive timely responses from a quorum. Experiments testing this hypothesis are described below.

A workload generator for NoSQL databases, such as one conforming to the Yahoo! Cloud Serving Benchmark (YCSB) open-source specification and/or developed using (or in accordance with) the YCSB program suite (framework), can use multiple threads and multiple servers to evaluate a range of NoSQL databases. In one example, the impact of garbage collection has been demonstrated by running such a benchmark on one server with ten client threads. In this example, a YCSB workload having 50% reads and 50% writes was run to perform 10 M operations on a Cassandra database with 1 M entries on 8 nodes, and heap occupancy was observed on the different nodes over time. In this example, the old generation heap size of the Cassandra database grew steadily over time, which may imply that a full collection becomes necessary only once in a relatively great while (e.g., once every 1-2 hours). These results may indicate that, at the timescale of individual requests, the focus for improvements in performance may be on the behavior of minor garbage collections. In some embodiments of the systems described herein, coordinated garbage collection may be utilized to alleviate the impact of minor garbage collections.

More specifically, the benchmark was run without coordinated garbage collection, and then with coordinated garbage collection. In this example, the average latency per query (for read queries and for update queries) was measured over a 10 millisecond interval after an initial warm-up phase on a multi-node system running a YCSB workload with 10 threads on a Cassandra database with 1 M entries. Without coordinated garbage collection, the mean latency for responding to requests was centered at approximately 0.5 milliseconds for much of the time, but included occasional (or periodic) spikes going up to tens, or even hundreds, of milliseconds (e.g., up to 200 milliseconds or more for read queries). In other words, most requests were handled very quickly (well below 1 ms). However, the occasional high-latency spikes can have a significant impact on the overall performance of an application built over NoSQL database, such as Cassandra. Many such applications (or applications with similar workloads) may issue multiple queries (e.g., to fetch different pieces of information needed for a web page), and the application's final result may only be produced once all of the queries have completed.

By comparing the times at which the high-latency spikes occurred and the times at which a minor garbage collection was performed on any of the nodes in the test system, it was observed that the times at which a server had an unexpectedly long response time corresponded to times during which there was garbage collection going on somewhere in the system (e.g., on at least one node in the system). This may suggest that garbage collection pauses may be the main contributor to these spikes and that alleviating the impact of garbage collection, such as by utilizing coordinated garbage collection, may avoid many of them. Based on these observations, garbage collection coordination efforts targeting these types of applications may be focused on controlling where garbage collection takes place (e.g., on which of the individual machines it takes place at different times) and where the client sends its requests (e.g., directing them away from machines that are performing, or are about to perform, a collection), in some embodiments. Note that in these experiments, no major garbage collections were observed during execution.

As observed during these experiments, many garbage collection pauses may be quite short, with the occasional pause being orders of magnitude higher. Thus, coordinating garbage collection over small timescales (e.g., over milliseconds rather than seconds) may alleviate the effect of garbage collection pauses, in at least some embodiments, and these timescales may be within the communication latency possible on modern clusters.

Coordinating Garbage Collection

As described herein, a prototype system has been built to assess the potential benefits of coordinating garbage collection across nodes in a rack-scale machine, according to different embodiments. In some embodiments, coordinated garbage collection may be implemented without requiring any changes to the JVM. Instead, a machine statistics monitoring tools, such as a jstat tool, may be used to periodically query a running JVM for occupancy of the different parts of its heap through any of various suitable interfaces, such as the JMX interface, according to various embodiments. In some embodiments, garbage collections may be externally triggered via a command, such as via the jcmd command line utility, for example. While in some embodiments, coordinated garbage collection may be implemented using a command line tool to trigger garbage collection, in other embodiments different methods for monitoring and for triggering garbage collection may be used.

In some embodiments, a central server may be executed on one node and all other nodes may spawn a monitoring client process that connects back to the server. In order to monitor heap occupancy, each client may launch an instance of the jstat tool in the background that samples the local JVM's heap occupancy periodically (e.g., every 200 ms, according to one embodiment).

The monitoring clients may check in with the server periodically (e.g., every 10 ms) to send the updated heap occupancy and to receive any commands related to coordinated garbage collection. For example, monitoring clients may receive commands related to triggering a full collection, to monitoring heap occupancy, or to querying the JVM for its uptime (e.g., for use in synchronizing timing numbers from different nodes).

The server may continuously collect the updated information from the monitoring clients and may (e.g., periodically) make decisions about whether or not to trigger a garbage collection. In some embodiments, the server may base coordinated garbage collection decisions based on a pre-selected policy. If a garbage collection is triggered, the server may send the corresponding command the next time that client checks in (e.g., within 10 ms), according to some embodiments. In other embodiments, the server may be configured to push a coordinated garbage collection command to one or more client nodes without waiting for the client to check in. In some embodiments, the server may be, or may include, a coordinated garbage collection coordinator (e.g., a GC Coordinator).

In other embodiments, however, coordinated garbage collection may be implemented without a central server. For instance, the various nodes may communicate and coordinate among themselves to implement a garbage collection policy allowing coordination of garbage collection. For example, in one embodiment, each node may monitor its own heap occupancy (e.g., as a percentage) and whenever one of the nodes determines that it should perform garbage collection, that node may send a message to the other nodes. In response, the other nodes may also perform garbage collection, thereby coordinating garbage collection among the nodes.

In yet other embodiments, the nodes may communicate among themselves to nominate and/or elect a leader to act as a GC Coordinator which may then coordinate the garbage collection activities of the nodes, as will be described in more detail below.

The techniques described herein for performing coordinated garbage collection may be implemented in a variety of systems, in different embodiments. However, the use of these techniques may be further illustrated by way of specific example systems. For example, in one embodiment, each of multiple machines (e.g., JVMs) in a distributed system may be extended to include a monitoring process that records the occupancy of the garbage collected heap. In this example, the system may exploit the fact that the interconnect between the machines has very low latency. For example, the system may provide a 1 millisecond query response time (on average), but may include an InfiniBand interconnect that allows messages to be passed between nodes (e.g., JVMs) within a few microseconds. In this example, each of the JVMs may record its heap occupancy (e.g., locally) and may periodically send that information to a garbage collection coordinator process. The coordinator process may be running on a machine that hosts one of the JVMs or on a separate machine (e.g., a machine other than those hosting the JVMs), in different embodiments. In one example embodiment, the monitoring processes may be attached to the JVMs through a debugging interface provided by the JVM, rather than through a modification of the JVMs themselves. In other embodiments, the JVMs may be modified to achieve tighter coupling between the monitoring components and the JVMs, potentially reducing the time it takes (within a machine) between gathering and/or recording heap information and sending it to the coordinator process. In general, logically speaking, the monitoring components may reside in a separate module or within the JVM itself.

In some embodiments, the coordinator process may be responsible for receiving the heap information, and for deciding when to trigger garbage collection on each of the machines, and what kind of garbage collection to trigger (e.g., whether to trigger a minor garbage collection, which removes objects from young generation heap space, or a major garbage collection, which removes objects from old generation heap space). In some embodiments, the coordinator process may also implement and/or apply distributed system-wide policies that specify when to expand or contract the heaps of the different JVMs. In this example (and in other embodiments), the garbage collection coordinator process may take advantage of the fact that (due improvements in interconnect technologies) the latency time for communication between nodes is now much faster than the garbage collection time itself). Therefore, even when a young generation collection can take 1 millisecond or 10 milliseconds, there may easily be enough time for several messages to make round trips between the JVM monitor and the coordinator process, thus allowing the coordinator process to enforce the kinds of garbage collection policies described herein (e.g., the "stop the world everywhere" policy).

Figure 4:
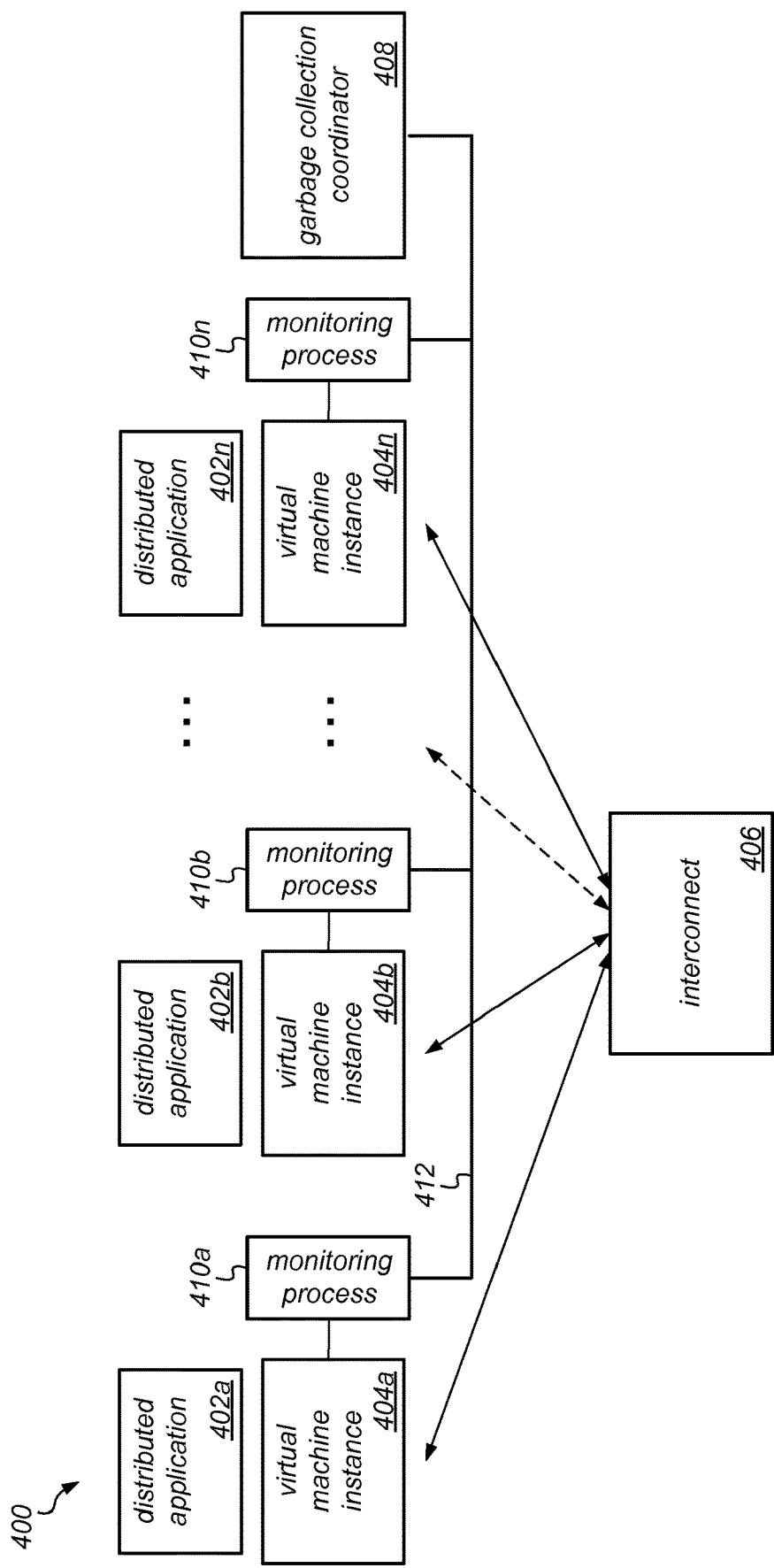
FIG. 4 is a block diagram illustrating one embodiment of system configured for implementing coordinated garbage collection.

FIG. 4 is a block diagram illustrating one embodiment of system configured for implementing coordinated garbage collection as described herein. In the example illustrated in FIG. 4, system 400 may include one or more physical computing nodes, each of which hosts one or more virtual machine instances, each virtual machine instance having a monitoring process or being associated with a corresponding respective monitoring process that is also executing on the computing node. For example, system 400 includes virtual machine instance 404a that is associated with monitoring process 410a; virtual machine process 404b that is associated with monitoring process 410b; virtual machine instance 404n that is associated with monitoring process 410n; and so on. In some embodiments, each monitoring process 410 may be co-located with a corresponding virtual machine instance 404. In various embodiments, each of these monitoring processes 410a-410n may gather information from the corresponding virtual machine instances 404a-404n that can be used to coordinate garbage collection on the virtual machine instances (or underlying physical computing nodes). For example, the monitoring processes 410a-410n may collect heap occupancy information from virtual machine instances 404a-404n (e.g., using the jstat tool, or similar), and may trigger garbage collection (e.g., using the jcmd command line utility, or similar) on one or more virtual machines instances (or computing nodes), as appropriate, according to an applicable garbage collection coordination policy. In another example, the monitoring processes 410a-410n may collect (or determine) the readiness state of the virtual machine instances 404a-410n (e.g., the readiness of each node to receive communication from other ones of the node, dependent on whether it is performing, or is about to perform, a collection).

As illustrated in FIG. 4, each virtual machine instance 404 may also be configured to execute one or more applications (or portions thereof). These are illustrated in FIG. 4 as distributed applications 402a-402n. In the example illustrated in FIG. 4, coordinated garbage collection may be implemented using a garbage collection coordinator 408. The garbage collection coordinator 408 may be configured to implement coordinated garbage collection to address the problems related to garbage collection described above. In various embodiments, the monitoring processes 410a-410n may exchange information with each other and/or with garbage collection coordinator 408 on a periodic basis (e.g., once every 10 ms) or on an as-needed basis (e.g., when a trigger condition is met for performing a collection on one of the virtual machine instances). For example, the garbage collection coordinator 408 may receive heap usage information from across system 400 and may select when and where, e.g., when and on what node(s), to trigger major or minor garbage collection operations. In various embodiments, a garbage collection coordinator process may execute as a separate server or as an elected leader from among the cooperating computing nodes (e.g. those that host virtual machine instances 404a-404n). Note that, in some embodiments, the monitoring processes 410a-410n may exchange information with each other and/or with garbage collection coordinator 408 over interconnect 406, while in other embodiments, they may exchange information with each other and/or with garbage collection coordinator 408 over a separate interconnect (shown as interconnect 412, in this example).

Figure 5:
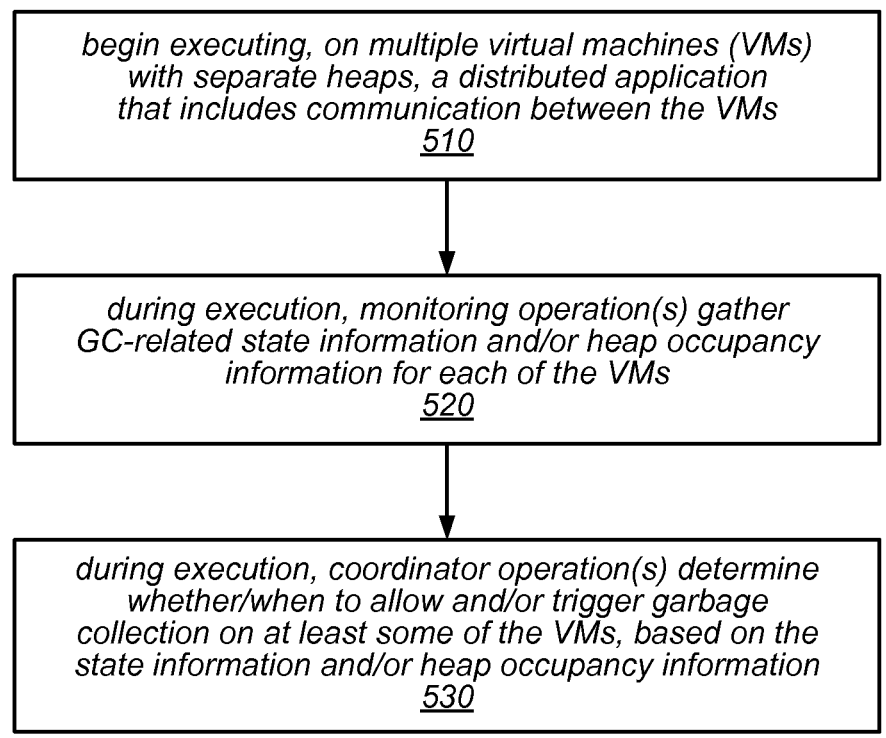
FIG. 5 is a flow diagram illustrating one embodiment of a method for coordinating garbage collection for a distributed application executing on multiple virtual machine instances.

One embodiment of a method for coordinating garbage collection for a distributed application executing on multiple virtual machine instances is illustrated by the flow diagram in FIG. 5. As illustrated at 510, in this example, the method may include beginning execution, on multiple virtual machine instances (VMs) each having its own separate heap, of a distributed application that includes communication between the virtual machine instances.

The method may include one or more monitoring operations (e.g., a centralized monitoring operation or multiple monitoring operations that are distributed across some or all of the virtual machine instances) gathering GC-related state information and/or heap occupancy information for each of the virtual machine instances during execution of the distributed application, as in 520. The method may also include one or more coordinator operations (e.g., a centralized coordinator operation or multiple coordinator operations that are distributed across some or all of the virtual machine instances) determining whether and/or when to allow (and/or trigger) major or minor garbage collection on at least some of the virtual machine instances, based on the state information and/or heap occupancy information that is gathered during execution, 530. For example, such a determination may be based on whether collections are (or are about to) take place on other ones of the virtual machine instances.

In some embodiments, the systems described herein may implement application program interfaces (APIs) for performing operations that support the coordinated garbage collection techniques described herein. For example, they may include an API that is usable to send heap information from each node (e.g., each JVM) to a coordinator process, and one or more other APIs that are usable by the coordinator to trigger minor or major garbage collection activity on particular nodes. In some embodiments, they may also include APIs for expanding or contracting the heap on a particular node (e.g., on a particular JVM). For example, in some cases, there may be a reason that particular node(s) need to collect more frequently than the others, rather than having the heaps of all of the nodes being of equal size and/or adhering to the same policies for when to trigger a collection. In such cases, the collector process may be configured to take that into account and invoke an operation to expand the heap(s) on those particular node(s).

As discussed above, problems related to garbage collection may stem from different nodes performing garbage collection at different times. As a result, nodes may not be able to perform useful work while other nodes perform garbage collection. In some embodiments, the use of load balancing within a data analytics cluster computing framework (e.g., the Spark framework) may allow the heap growth rates to be set to be similar across all of the nodes. In such embodiments, an application as a whole may tend to need to collect on each node at approximately the same time, and a coordinated garbage collection policy may change the timing of collections on each node but may not substantially increase their frequency.

Figure 6:
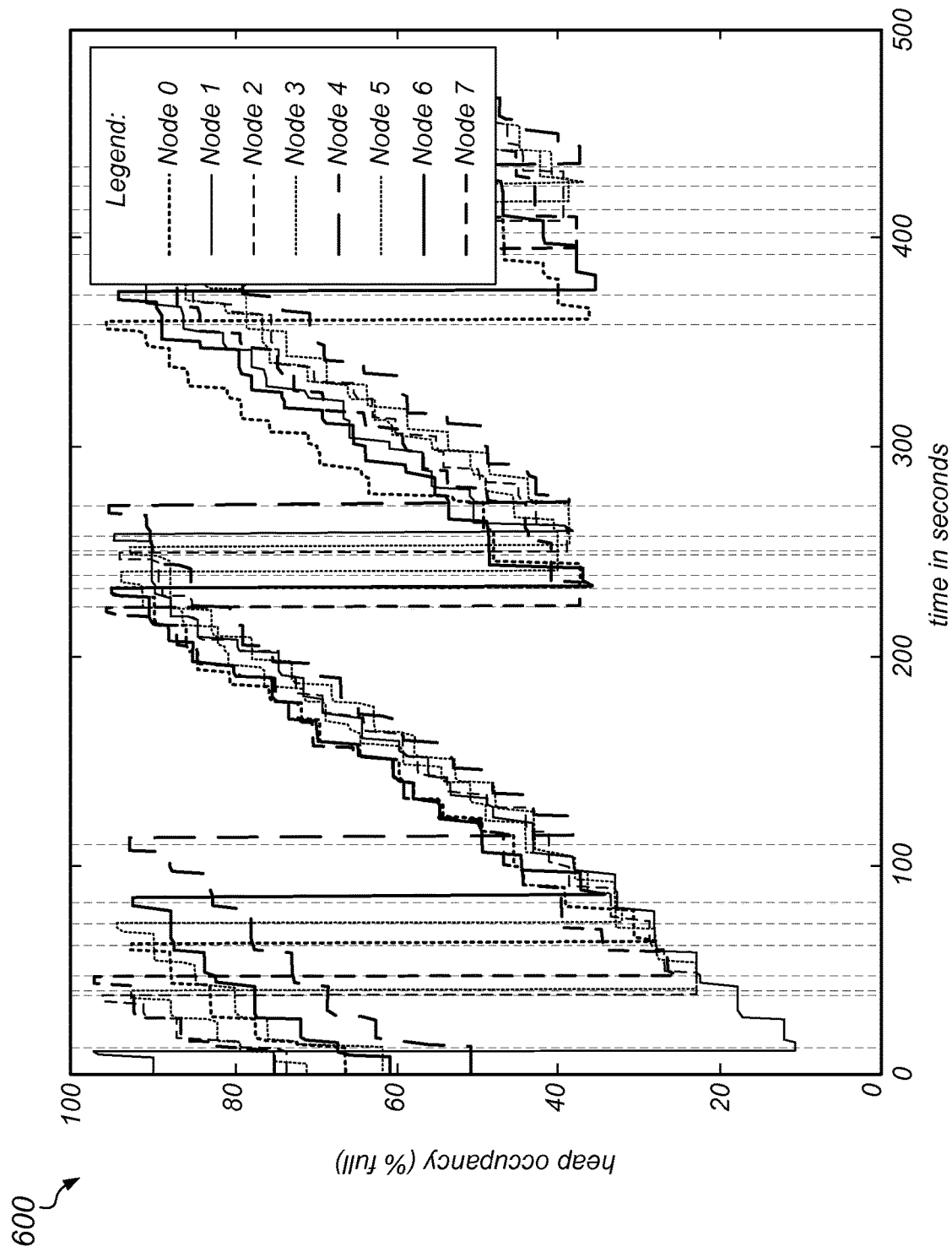
FIG. 6 is a graph illustrating the old generation size on the different nodes of a PageRank computation over time without coordination, as in one embodiment.

To test this hypothesis, the old generation size on different nodes was measured over time. More specifically, old generation size was measured on the different nodes of the PageRank computation over time without garbage collection coordination, and the results are illustrated in FIG. 6. In this example, the vertical lines in graph 600 indicate points at which garbage collection pauses were taken on any of the nodes, and each of the patterned lines indicates the old generation size of a respective number of nodes (according to the Legend). It was observed that the old generation fills up at a similar rate on the different nodes, but garbage collection is triggered at different times, causing garbage collection pauses to not overlap. In this example, as the heap on each node grew (as the computation proceeded), the time between synchronization intervals on that node also grew. The synchronization interval then dropped back down after garbage collection was performed. In this example, which does not include garbage collection coordination, each machine performed garbage collection whenever it determined that it needed to (without regard to what any other nodes were doing), which delayed the other nodes. Note that the amount of work represented in the graph in FIG. 6 took approximately 500 seconds to perform without garbage collection coordination.

Figure 7:
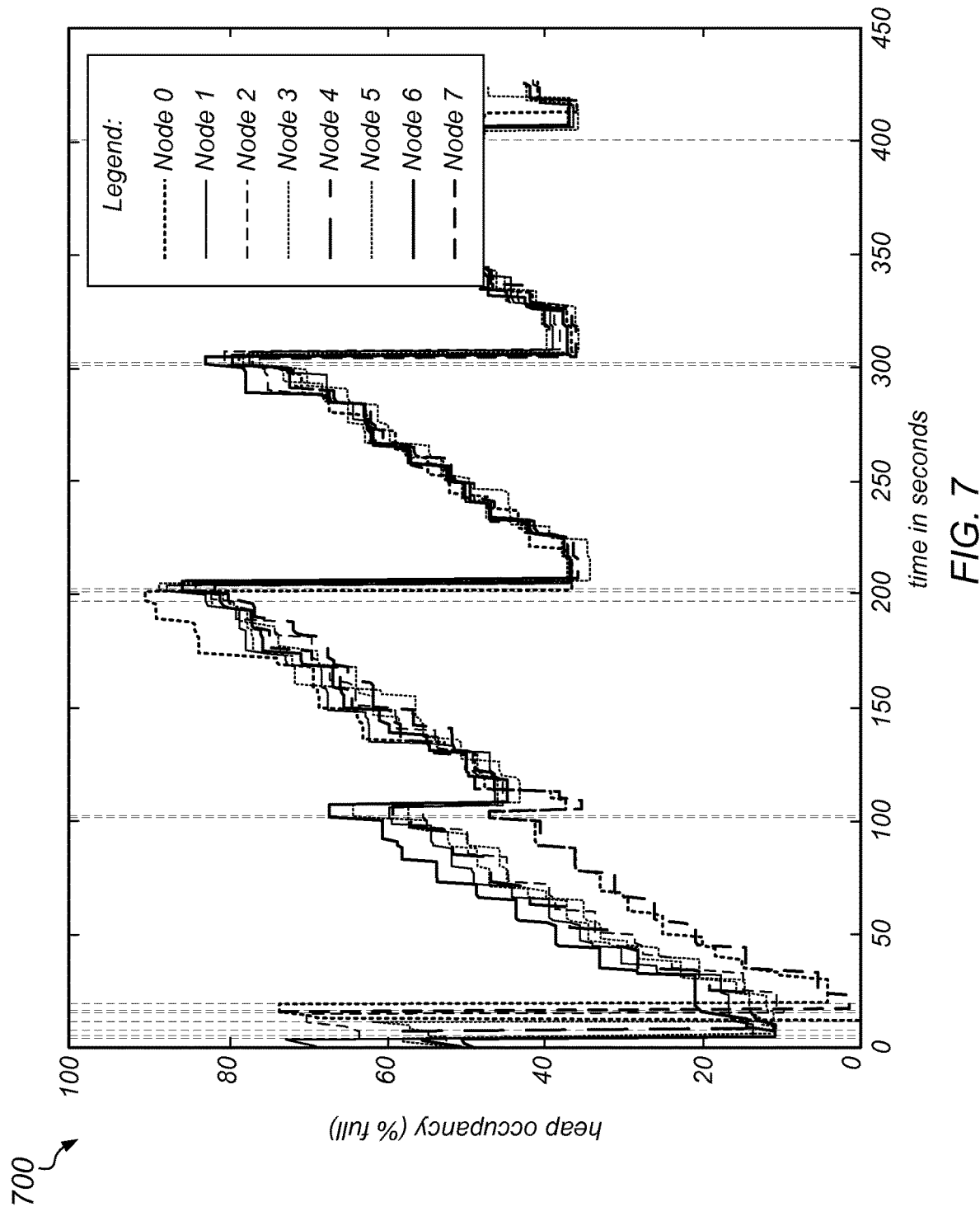
FIG. 7 is a graph illustrating the triggering of a collection on a fixed interval, according to one embodiment.

In testing the hypothesis, the old generation of different nodes was also measured over time when coordinated garbage collection was implemented. Here again, old generation size was measured on the different nodes of the PageRank computation over time without garbage collection coordination, and the results are illustrated in FIG. 7. In this example, the vertical lines in graph 700 indicate points at which garbage collection pauses were taken on any of the nodes, and each of the patterned lines indicates the old generation size of a respective number of nodes (according to the Legend). As in the previous example, as the heap on each node grew (as the computation proceeded), the time between synchronization intervals on that node also grew. The synchronization interval then dropped back down after garbage collection was performed. However, in this example, the garbage collection coordinator was configured to trigger a full collection on all nodes once every 100 seconds. Note that, based on the previous measurements, this interval appeared to be slightly less than the average gap between full collections without coordination. As shown in FIG. 7, garbage collection cycles were performed at substantially the same time on the different nodes and across the application (e.g., the vertical lines in FIG. 7 align and overlap), unlike in FIG. 6. Note that the time it took to perform the amount of work represented in the graph in FIG. 7 (which was the same as the amount of work represented in FIG. 6) was reduced from approximately 500 seconds to approximately 450 seconds due to the introduction of garbage collection coordination.

Note that while in this example, a full collection was triggered on a fixed schedule (e.g., every 100 seconds), in other embodiments, a full collection may be triggered based on other criteria, such as a maximum heap occupancy rate. In another example, in one embodiment, a full collection may be triggered based on an average time between full collections without coordination.

Figure 8:
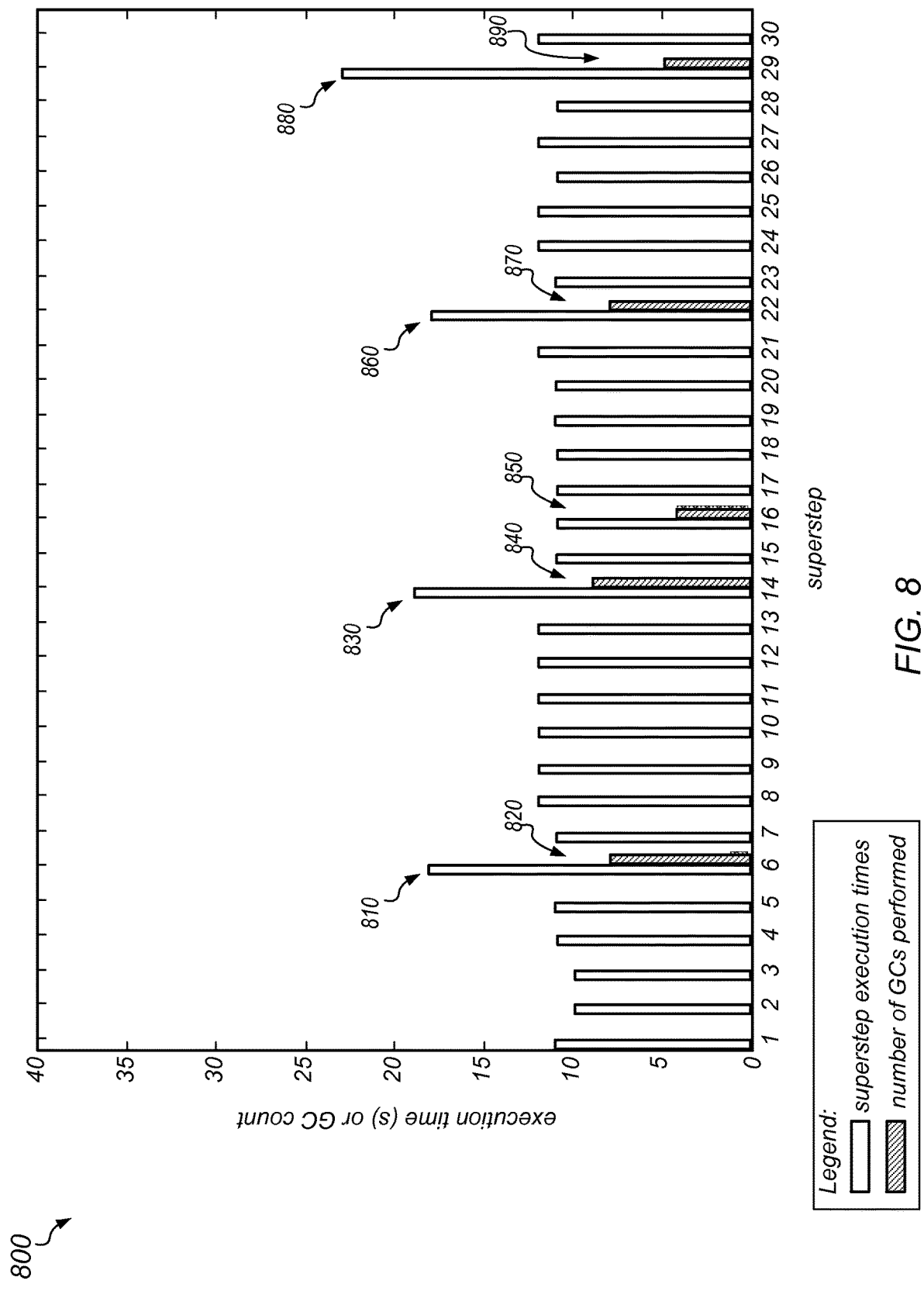
FIG. 8 is a graph illustrating the duration of each super-step of the PageRank computation when a coordinated collection is triggered on all nodes at a fixed interval, as in one embodiment.

As illustrated in the example above, in some embodiments, coordinated garbage collection may result in the superstep times becoming more regular. In other words, under a "stop the world everywhere" approach to garbage collection coordination, either all of the machines are stopped in order to perform garbage collection at substantially the same time or all of the machines are running normally (without performing any garbage collection operations). A premise of this type of coordination approach is that, since any one machine performing garbage collection can hold up all of the other machines, the other machines might as well run garbage collection, too (e.g., at the same time) because they are unlikely to make any significant progress while any other machine is performing garbage collection. This approach is further illustrated by the graphs in FIGS. 8 and 9. For example, graph 800 in FIG. 8 illustrates the duration of each superstep of a PageRank computation when a coordinated garbage collection is triggered on each node every 100 seconds under a "stop the world everywhere" type garbage collection coordination policy. More specifically, the unfilled bars in FIG. 8 illustrate the execution times (in seconds) of each superstep of a PageRank algorithm (e.g., they illustrate the lengths of the intervals between pairs of synchronization points during execution of the benchmark), while the hashed bars indicate the number of nodes, if any, that performed a full garbage collection during each superstep. In this example, it was observed that, since garbage collection was triggered on all of the nodes at a fixed interval, there were fewer supersteps affected by garbage collection pauses. Here, multiple nodes performed garbage collection during supersteps 6 (shown at 820), 14 (shown at 840), 16 (shown at 850), 22 (shown at 870), and 29 (shown at 890).

In this example, it was observed that the affected supersteps took less time (or were roughly as long as) the most severely affected supersteps in a system without coordinated garbage collection, as shown by a comparison of FIG. 2 and FIG. 8. For example, many of the longest superstep times illustrated in FIG. 8 (e.g., approximately 18 seconds for supersteps 6 and 22, shown at 810 and 860; and approximately 19 seconds for superstep 14, shown at 830) were much shorter than the longest supersteps without garbage collection coordination, and the longest superstep (e.g., approximately 22 seconds for superstep 29, shown at 880) was no longer than the longest supersteps without garbage collection coordination. In other words, this example illustrates that, in at least some embodiments, if all garbage collection pauses occur in the same phase (as when using coordinated garbage collection), they overlap, while without coordinated garbage collection, collections may occur in different phases of the same superstep, adding up their runtimes (as other nodes are waiting on the barrier while the collection is performed, rather than performing their own collections at the same time).

Figure 9:
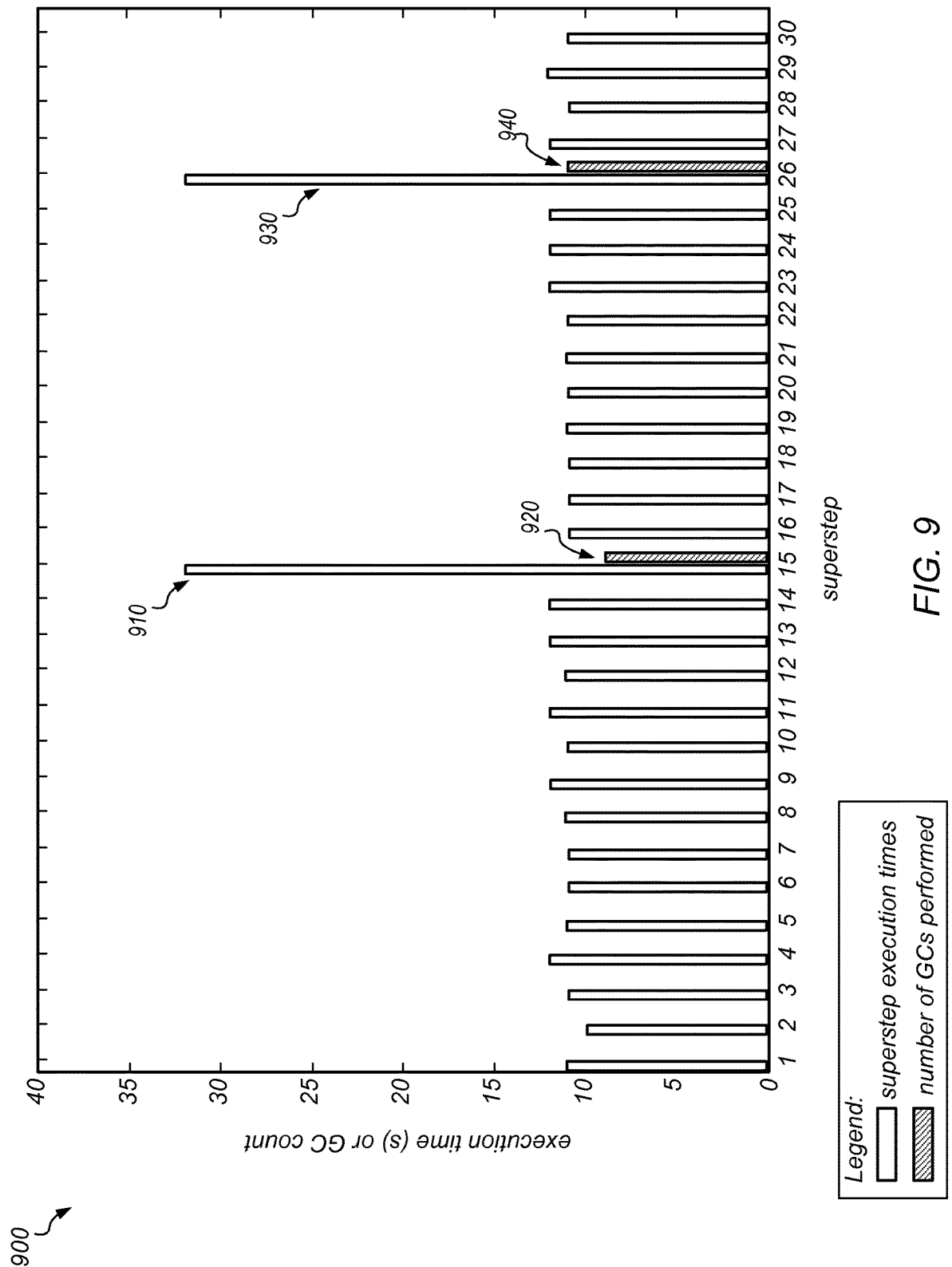
FIG. 9 is a graph illustrating the duration of each super-step of the PageRank computation when a coordinated collection is triggered on all nodes when one of them reaches a maximum heap occupancy threshold, as in one embodiment.

In another example, graph 900 in FIG. 9 illustrates the duration of each superstep of a PageRank computation when a coordinated garbage collection is triggered on each node when any one node reaches a predetermined maximum threshold for heap occupancy under a "stop the world everywhere" type garbage collection coordination policy. More specifically, the unfilled bars in FIG. 9 illustrate the execution times (in seconds) of each superstep of a PageRank algorithm (e.g., they illustrate the lengths of the intervals between pairs of synchronization points during execution of the benchmark), while the hashed bars indicate the number of nodes, if any, that performed a full garbage collection during each superstep. In this example, it was observed that all of the hashed bars indicating multiple garbage collections are clustered together, since garbage collection is performed on all of the machines at the same time). For example, multiple garbage collections are performed during superstep 15 (shown at 920) and superstep 26 (shown as 940). Here, the worst-case superstep intervals (e.g., intervals of approximately 32 seconds during for superstep 15, shown at 910, and for superstep 26, shown at 930) were approximately 10 percent longer than the worst-case superstep interval without garbage collection coordination. However, none of the other supersteps include any garbage collection operations, and these other supersteps have relatively consistent execution times of approximately 12 seconds (as was the case for the fastest supersteps in the example without garbage collection coordination). In other words, all of the superstep intervals of medium length (e.g., intervals between 14-28 seconds) shown in FIG. 2 were eliminated using this approach (i.e., they were replaced by faster intervals of approximately 12 seconds), The results of this example are similar to those of the experiment in which garbage collection was triggered on fixed intervals (illustrated in FIG. 8), but this approach does not require manual configuration of a collection interval.

As illustrated in these and other examples, a "stop the world everywhere" approach to coordinated garbage collection may be an effective approach for use with applications in which the overall throughput is important, such as in the long-running applications described herein. Note, however, that in other embodiments, these techniques may also be applicable in other situations in which the system is given a lot of work to do and it needs to make a good progress through that work as quickly as possible (e.g., in other types of applications in which it is desirable to minimize the amount of time it takes to complete a certain amount of work).

While described above mainly in terms of manually setting an interval on which to perform a coordinated garbage collection, in some embodiments, coordinated garbage collection may determine when to perform coordinated garbage collections based on other criteria instead of, or in addition to, a time interval. For example, some garbage collection coordination policies may not rely on manually setting a fixed time interval at which to perform a coordinated garbage collection (e.g., periodically). Instead, in some embodiment, collected heap measurements from different nodes may be used to trigger a collection. For example, according to one policy, as soon as any node reaches a pre-defined heap occupancy (e.g., 80% heap occupancy), the GC Coordinator may trigger a full collection.

Figure 10:
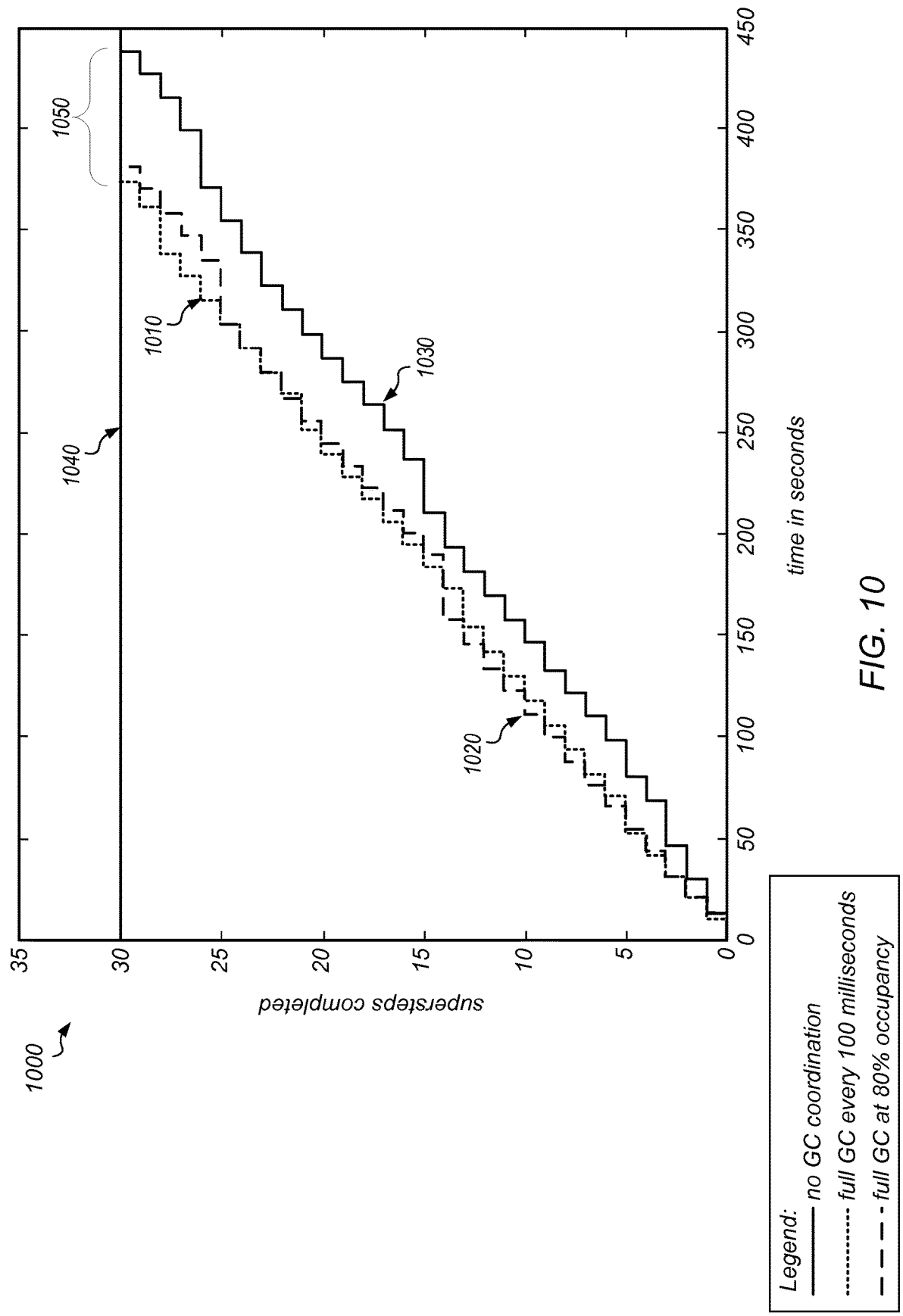
FIG. 10 is a graph illustrating a comparison of different garbage collection coordination policies based on execution time, according to at least some embodiments.

FIG. 10 is a graph illustrating an overall effect of coordinated garbage collection on the execution time of a complete application. More specifically, in this example, graph 1000 illustrates a comparison of the different garbage collection coordination policies described above in terms of the execution time of a PageRank computation. This graph depicts the overall progress of the distributed computation over thirty synchronization intervals (or supersteps) worth of work. In this example, the graph plot illustrates the time after which each PageRank superstep finished (e.g., the horizontal line indicates the completion of the computation). Here, the solid line 1030 represents the execution of the application without garbage collection coordination, the dotted line 1010 represents the execution of the application using a "stop the world everywhere" approach to garbage collection coordination in which a full garbage collection was triggered once every 100 seconds, and the dashed line 1020 represents the execution of the application using a "stop the world everywhere" approach to garbage collection coordination in which a full garbage collection was triggered when at least one node reached a heap occupancy of 80% full.

As is shown in FIG. 10, execution of the application using either of the coordination policies (e.g., fixed, time based collections and collections triggered by a maximum heap occupancy threshold) may outperform the execution of the same distributed application when the application is executed without coordinated garbage collection. For instance, in the example embodiment illustrated by FIG. 10, implementing coordinated garbage collection resulted in an overall speed-up of the complete application (e.g., for thirty supersteps, shown at 1040) of approximately 15% (e.g., an improvement from approximately 440 seconds without coordinated garbage collection to approximately 375-380 seconds with coordinated garbage collection, as shown at 1050). Note that in other embodiments, such as in larger systems, the scalability of these types of applications may be harmed more by garbage collections, and the impact of adding these garbage collection coordination techniques may have an even larger (positive) impact on performance.

For a distributed NoSQL data management system, such as Cassandra, a critical factor in causing long request latencies may be whether a request experiences collection at the node that handles it initially (e.g., whether the request is held up until the collection is complete). In contrast, if a request experiences collection at one of the data replicas, then the request may still be serviced by other replicas (assuming that there are not so many collections in progress that a quorum cannot be achieved). In some embodiments, coordinated garbage collection may involve controlling the load balancing of requests across Cassandra nodes to steer requests away from nodes that are close to performing collection. In other words, in some embodiments, the systems described herein may implement GC-aware work distribution in which client requests are steered to particular nodes, avoiding those that will need to perform a minor collection in the immediate or near future.

Several experiments were performed to assess the potential of this approach using a small 4-node cluster of a Cassandra data management system with and without coordinated garbage collection. In these experiments, heap occupancy levels were tracked in the young generation heap space (e.g., Eden space) at each node, and sent back to the machine running the GC Coordinator. In the first experiment (without coordinated garbage collection), the Cassandra benchmark, running on that same machine, picked any node to contact, as is the usual case without coordinated garbage collection. The node that was selected was recorded, and the results were processed and plotted to show request latencies separately for each of the four nodes. This provided a visual indication of whether long request latencies coincided with the times at which garbage collection occurred on the respective nodes. This experiment was repeated using an approach to coordinated garbage collection in which the benchmark was configured to steer requests away from nodes whenever their heap occupancy (in the young generation heap space) was above a particular (e.g., possibly predetermined) threshold. For example, in one experiment in which requests were steered away from nodes on which the young generation heap occupancy was above 90%. Note that, in these experiments, no specific efforts were made to trigger garbage collection. In these experiments, even though the nodes were not receiving requests directly from the benchmark harness, they would still be holding data replicas and receiving read/write requests from other Cassandra nodes. These read/write requests would continue to cause memory allocation, and in turn trigger the performance of additional garbage collections, as needed.

In some of these experiments, the latency of read queries on each node in the system without coordinated garbage collection was compared to the latency of read queries on each node in the system with coordinated garbage collection (in a system in which requests were steered away from nodes in which the young generation heap occupancy was at or above 90%). In these experiments, the young generation heap occupancy on each began filling up with data and, at some point, a garbage collection was performed, At this point, the occupancy dropped back down, after which it began filling up again. In these experiments, the four nodes of the cluster did not necessarily exhibit the same occupancy patterns. For example, they did not all fill at the same rate, depending on the workload (e.g., based on the fact that clients tended to access data on one or more of the machines more frequently than on others). It was observed that spikes in the read query latency (read query response times) for each machine corresponded to a point at which a read query request was sent to that machine while garbage collection was being performed on the machine. That is, in all of these experiments (with and without coordinated garbage collection), latency spikes coincided with garbage collection at the target node. However, many (or most) of the highest latency spikes that were observed in the experiments done without coordinated garbage collection were avoided when GC-aware request steering was implemented (i.e., when the system avoided sending requests to machines that were about to perform garbage collection). Any remaining latency spikes may, in some embodiments, be caused by requests that cannot avoid quorums which include a node performing a collection. Note that this effect may have been exacerbated by the use of a small 4-node cluster in these experiments.

Figure 11:
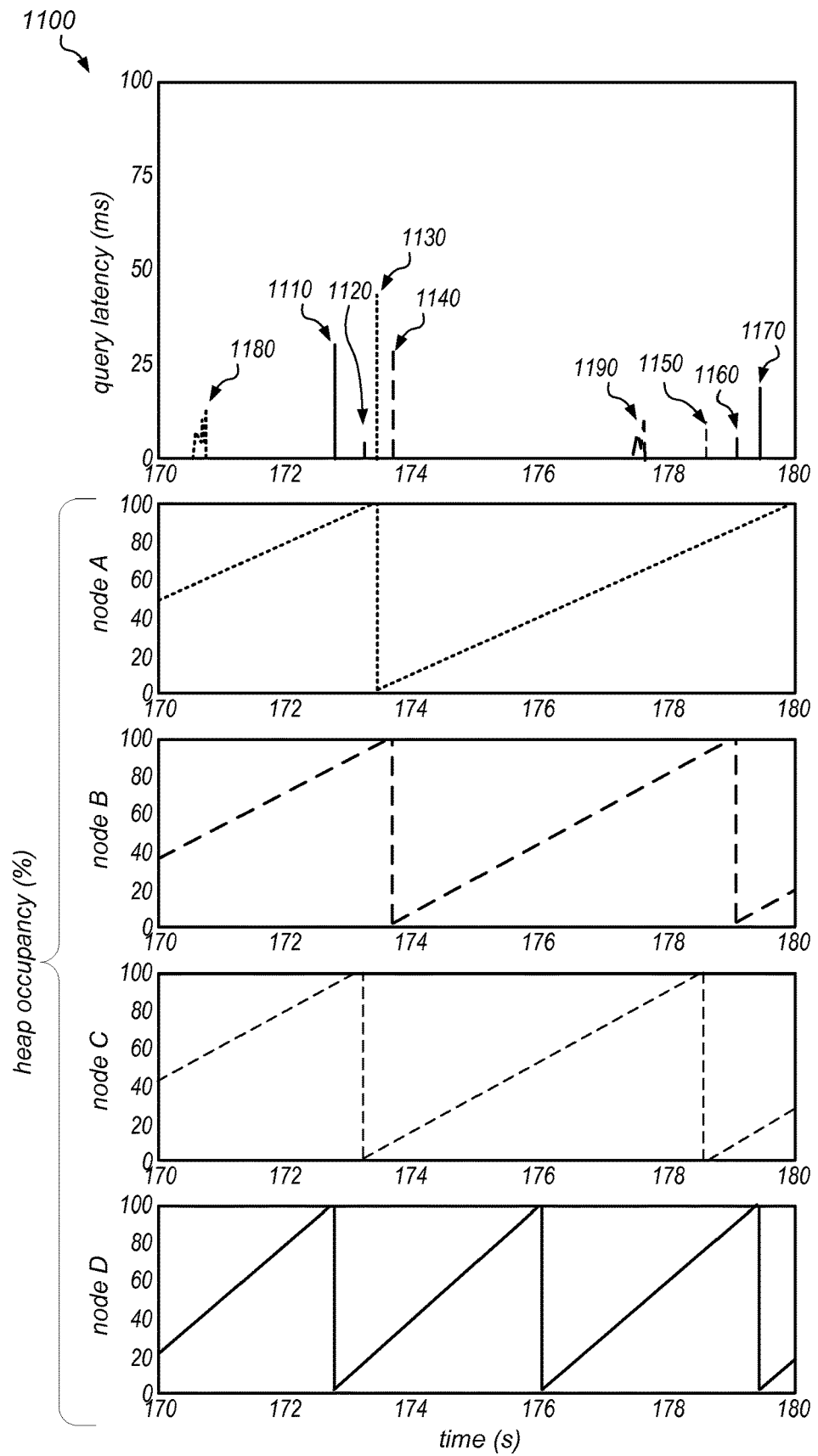
FIGS. 11 and 12 are graphs illustrating heap occupancies and corresponding read query latencies without garbage collection coordination and with garbage collection coordination, respectively, according to one embodiment.
Figure 12:
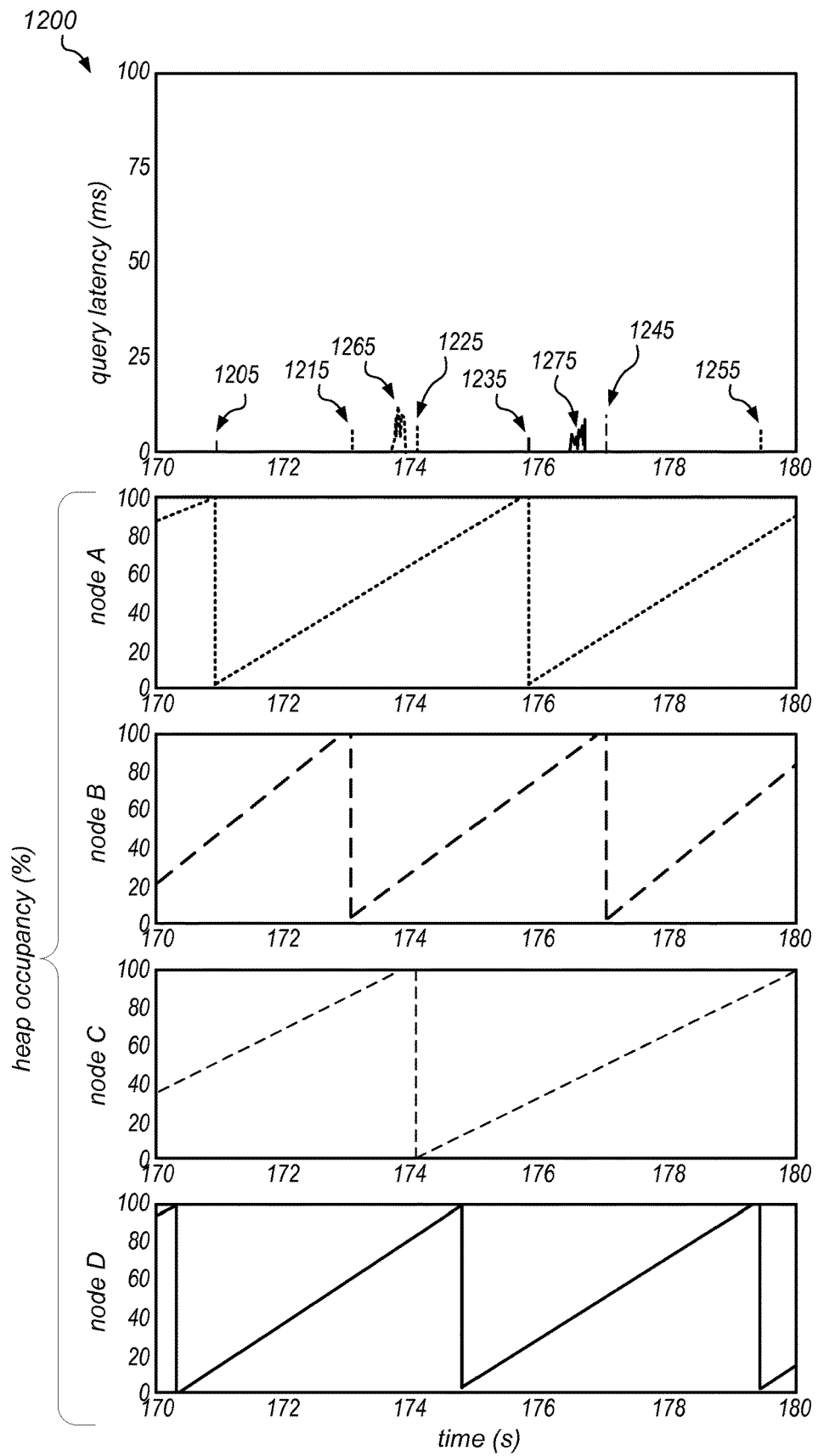

The techniques described herein, and their effects on performance (specifically read query latency), are further illustrated by FIGS. 11 and 12, according to one embodiment. These figures include graphs illustrating heap occupancies and corresponding read query latencies without garbage collection coordination and with garbage collection coordination, respectively, during a small window of execution time (e.g., shown as the time interval 170-180 seconds). In this example, graph 1100 in FIG. 11 illustrates the behavior of a system without coordinated garbage collection. More specifically, the uppermost graph in FIG. 11 illustrates spikes in read query latency (e.g., spikes in the read response times for the nodes of a 4-node cluster on which a distributed application is executing) that occurred within the depicted window of execution time. Each of the four other graphs in FIG. 11 illustrates the heap occupancy of a respective one of the nodes on which the application is executing during the same window of execution time (shown as a percentage of the heap).

In this example, the longest latency requests occur at the points at which a collection begins on a corresponding heap. In other words, each one of the largest spikes corresponds to a peak in heap occupancy for a respective one of four nodes on which the distributed application is executing and a corresponding garbage collection. In this example, the spike labeled 1110 represents a spike in read query latency on node D and it occurs at a point immediately (or soon) after the heap occupancy of node D peaks (i.e., as a garbage collection begins on node D). Spike 1170 also represents a spike in read query latency on node D and it occurs at another point immediately (or soon) after the heap occupancy of node D peaks. Similarly, spikes 1120 and 1150 represent spike in read query latency on node C that occur after the heap occupancy of node C peaks and a collection begins, spike 1130 represents a spike in read query latency on node A that occurs after the heap occupancy of node A peaks and a collection begins, and spikes 1140 and 1160 represent spike in read query latency on node B that occur after the heap occupancy of node B peaks and a collection begins.

By contrast, graph 1200 in FIG. 12 illustrates heap occupancy and read query latency in a system that employs coordinated garbage collection with request steering when executing the same distributed application on the 4-node cluster. As illustrated in this example, the longer latency spikes shown in FIG. 11 (which coincided with garbage collection at the target node) may be avoided by using coordinated garbage collection. Here, the relatively small spikes shown in FIG. 12 may correspond to points at which garbage collection occurs on one of the nodes other than the one to which a request was issued. For example, the small spike labeled 1205 may represent the response latency for a request that was issued to node C while a collection occurred on node A. Similarly, the small spike labeled 1215 may represent the response latency for a request that was issued to node A while a collection occurred on node B, the small spike labeled 1225 may represent the response latency for a request that was issued to node A while a collection occurred on node C, the small spike labeled 1235 may represent the response latency for a request that was issued to node D while a collection occurred on node A, the small spike labeled 1245 may represent the response latency for a request that was issued to node C while a collection occurred on node B, and the small spike labeled 1255 may represent the response latency for a request that was issued to node A while a collection occurred on node D, in this example. In some embodiments, these smaller spikes may occur, for example, when the quorum that the node to which the request is issued contacts includes a node that is performing a garbage collection. In such embodiments, if the system includes a replication factor of three, this would still allow a response to be returned (since any one node collecting cannot prevent a quorum of two being formed).

Note that in both FIG. 11 and FIG. 12 there are occasional wider peaks present in the query latency graphs (e.g., the peaks labeled 1180 and 1190 in FIG. 11, and those labeled 1265 and 1275 in FIG. 12). In some embodiments, such wider peaks may occur when a housekeeping activity is being performed within the distributed system itself (e.g., within the Cassandra data management system itself).

In other experiments, the latency of update queries on each node in the system without coordinated garbage collection was compared to the latency of update queries on each node in the system with coordinated garbage collection (in a system in which requests were steered away from nodes in which the young generation heap occupancy was at or above 90%). As in the previously described experiments, the young generation heap occupancy on each began filling up with data and, at some point, a garbage collection was performed, At this point, the occupancy dropped back down, after which it began filling up again. Here again, the four nodes of the cluster did not necessarily exhibit the same occupancy patterns. As in the previous experiments, it was observed that spikes in the update query latency (update query response times) for each machine corresponded to a point at which an update query request was sent to that machine while garbage collection was being performed on the machine. However, many (or most) of the highest latency spikes that were observed in the experiments done without coordinated garbage collection were avoided when GC-aware request steering was implemented (i.e., when the system avoided sending requests to machines that were about to perform garbage collection). As with the read query results, any remaining latency spikes may, in some embodiments, be caused by requests that cannot avoid quorums which include a node performing a collection, and this effect may have been exacerbated by the use of a small 4-node cluster in these experiments.

Figure 13:
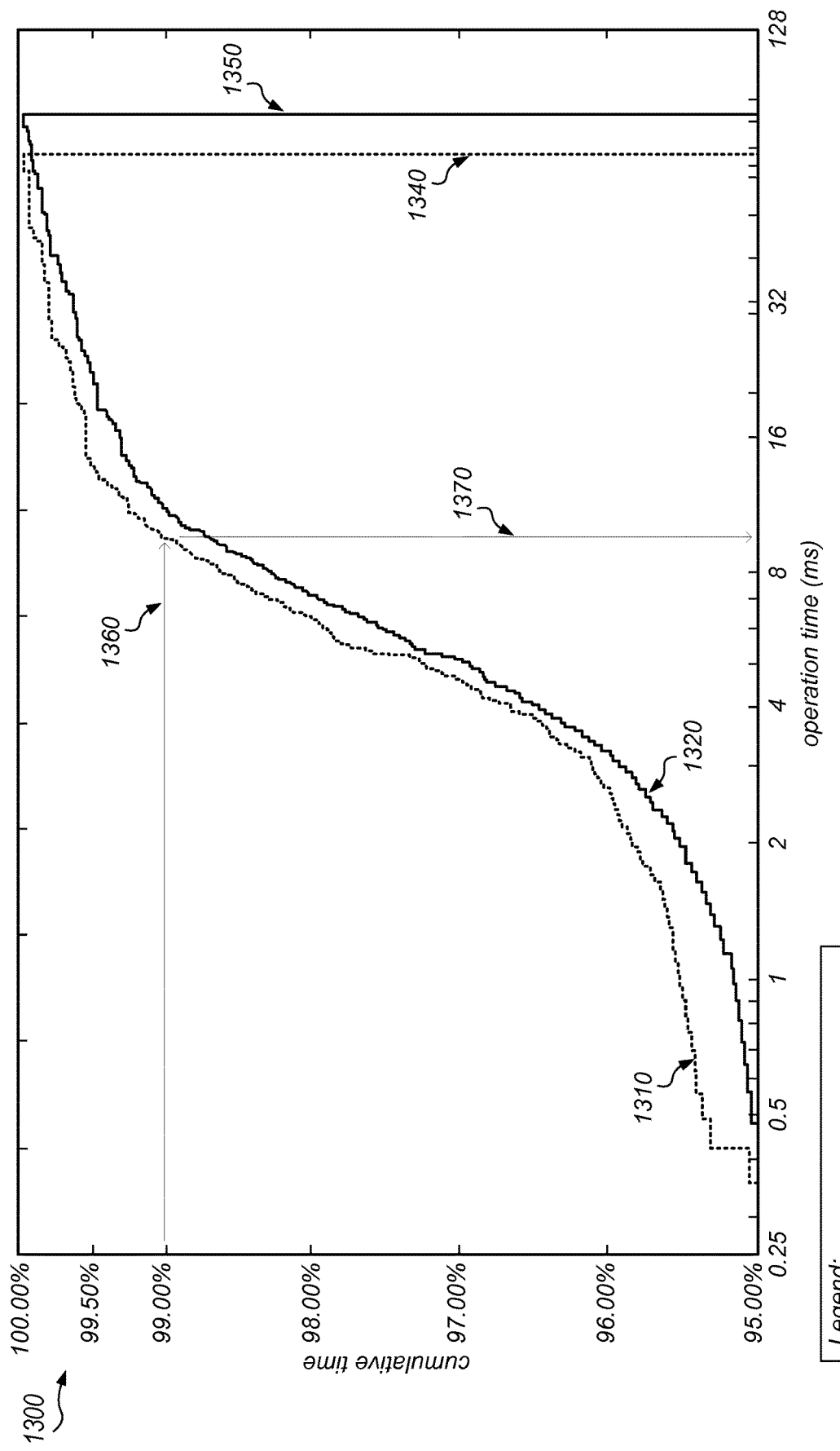
FIGS. 13 and 14 are graphs illustrating response time distributions for read queries and update queries, respectively, without GC-aware query steering and with GC-aware query steering, according to one embodiment.
Figure 14:
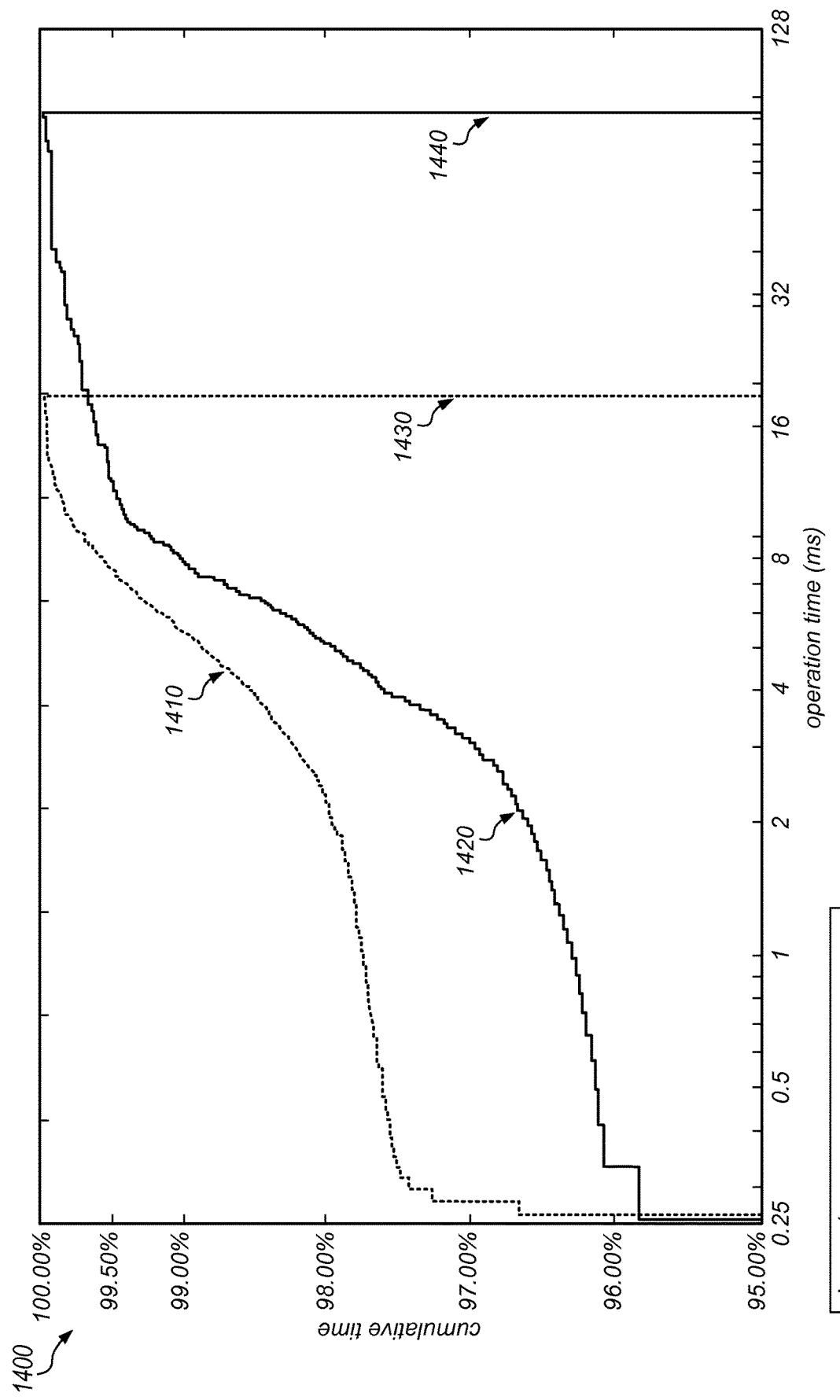

FIGS. 13 and 14 are graphs illustrating response time distributions for read queries and update queries, respectively, without GC-aware query steering and with GC-aware query steering, according to some embodiments. More specifically, these graphs illustrate example differences between response times in systems without coordinated garbage collection and response times in systems implementing coordinated garbage collection with request steering. In these figures, the dotted lines (e.g., 1310 in FIGS. 13 and 1410 in FIG. 14) illustrate the results with GC-aware query request steering, and the solid lines (e.g., 1320 in FIGS. 13 and 1420 in FIG. 14) illustrate the results without GC-aware query request steering. The x-axis of each graph represents the request latency, and the y-axis represents that proportion of waiting time that has been spent in requests at a given latency or lower. The results illustrated in both of these two figures illustrates that, in at least some embodiments, the use of coordinated garbage collection with request steering may improve the response times.

As shown at the intersection of 1360 and 1370 in the example illustrated in FIG. 13, 99% of the cumulative read response time was spent waiting for read requests that take on the order of 8 milliseconds. The remaining 1% of the time was spent waiting for read requests that take longer than about 8 milliseconds (e.g., up to about 100 milliseconds without GC-aware query steering, shown by the vertical drop 1350 in line 1320, and up to about 75 milliseconds with GC-aware query steering, shown by the vertical drop 1340 in line 1310). In other words, the maximum response time for read queries was reduced by approximately 25% when GC-aware query steering was implemented, thus leading to an improvement in the cumulative read query response times. FIG. 14 illustrates an even greater improvement in the maximum (and also cumulative) response times when employing GC-aware query steering for update queries. For example, the vertical drop 1440 in line 1420 and the vertical drop 1430 in line 1410 illustrate a great improvement in the maximum update query response time when the system implements GC-aware query steering. In this example, the maximum response time for update queries was reduced by almost 75% (e.g., from about 75 milliseconds to 20 milliseconds) when GC-aware query steering was implemented.

In some embodiments, the systems described herein may implement a number of general coordination approaches (each of which supports a different garbage collection coordination policy or strategy) that can be selected by a developer of a distributed application (e.g., they can be selected and applied to various distributed applications). For example, by implementing even a small number of these general approaches, the system may be configured to provide a coordinated garbage collection approach that is suitable for use with a large number of distributed applications. These approaches may include the "stop the world everywhere" approach described herein (or variants thereof), which may be suitable for applications that include a lot of internal communication and that cannot make much (if any) progress anywhere if any of the machines is stopped. They may also include the staggered garbage collections policy described herein, which may ensure that (unless one of machine is absolutely out of memory and has to stop to perform immediate garbage collection) at most one machine (or a small number of machines) is stopped for garbage collection at a time.

In some embodiments, these systems (or a garbage collection coordinator process running thereon) may expose an API that allows the application(s) to discover which of the machines are stopped at any one time. In some embodiments, in addition to knowing that only one machine will be stopped at any given time, an application may need to know which is the unlucky machine that is stopped (or that will be stopped soon) so that it can stop sending requests to that machine (e.g., at that time, and for some length of time) until the collection is done.

In some embodiments, the systems described herein may also implement a GC-aware communication library that may be used within applications, and which can hide the use of the API from the application programmer. For example, the communication library may expose an "anycast" operation (i.e., an operation that allows a message to be sent to any one of a specified set of receivers) and the library may be able to pick which of the machines to communicate with. In this example, the library may encapsulate the choice based on which machines are stopped for garbage collection (or are about to stop for garbage collection) or are actively running. In some such embodiments, any concern over which of the machines are active or stopped may be shielded from application programmers by handling request steering within the operations in a common communication library, rather than in the application itself. In some embodiments, the selection of a garbage collection coordination approach from among multiple system-wide policies may be made on an application-specific basis. Therefore, the applications themselves may not need to include mechanisms to coordinate garbage collections (whether all at the same time or using a staggered approach).

As described in detail herein, preliminary results illustrate that, in at least some embodiments, coordinating garbage collection across distributed applications may improve performance. While in some embodiments, application programmers may implement coordinated garbage collection by individually coding applications to track heap usage and to manually trigger garbage collection, in other embodiments, it may be undesirable for application programmers to be responsible for tracking heap usage and manually triggering collections.

In different embodiments, coordinated garbage collection may be implemented using a variety of techniques. As described above, implementing coordinated garbage collection may involve selecting from among a number of general coordination approaches on a per-application basis (as with garbage collection algorithms within a single node). For example, a number of general-purpose garbage collection policies may be supported by the system (e.g., by the GC Coordinator, the cluster nodes, and/or an underlying operating system). For instance, in one embodiment, a "stop the world everywhere" policy and/or a "staggered garbage collections" policy (which attempts to spread the garbage collection activity of different nodes out over time) may be selected when deploying or tuning a distributed system, much like individual policies may be selected within a single node.

As noted above, a "stop the world everywhere" policy may, in some embodiments, synchronize the start of collection across the nodes in the system. In some embodiments, a "stop the world everywhere" policy may be implemented within coordinated garbage collection by using a broadcast message at the start of collection on any node. In other embodiments, however, a leader election protocol may be used in which a leader node is notified of a collection and the leader then notifies the other nodes. When implementing coordinated garbage collection utilizing a "stop the world everywhere" policy, a collection (or potential collection) on any node may trigger a collection on all of the other nodes. For example, a "stop the world everywhere" policy may trigger collection on all nodes when any one node reaches a threshold heap occupancy. However, in some embodiments, whether or not collections are started on other nodes may be optionally subject to a threshold, such as if heap occupancies and/or allocation rates are mismatched between some of the nodes.

In various embodiments, a "stop the world everywhere" policy may be implemented in a variety of different ways. For example, in some embodiments, a garbage collection coordinator process may receive notifications of heap usage, and may broadcast a request to stop to all of the machines to perform garbage collection when any one of them gets to the point at which it needs to collect. In other embodiments (e.g., those that do not include a separate garbage collection coordinator policy), each machine may directly broadcast to the other machines (i.e., the other members of the distributed system) when it performs (or is about to perform) a collection (e.g., if its heap occupancy reaches a predetermined threshold), which may indicate to the other nodes that they should also perform a collection.

Figure 15:
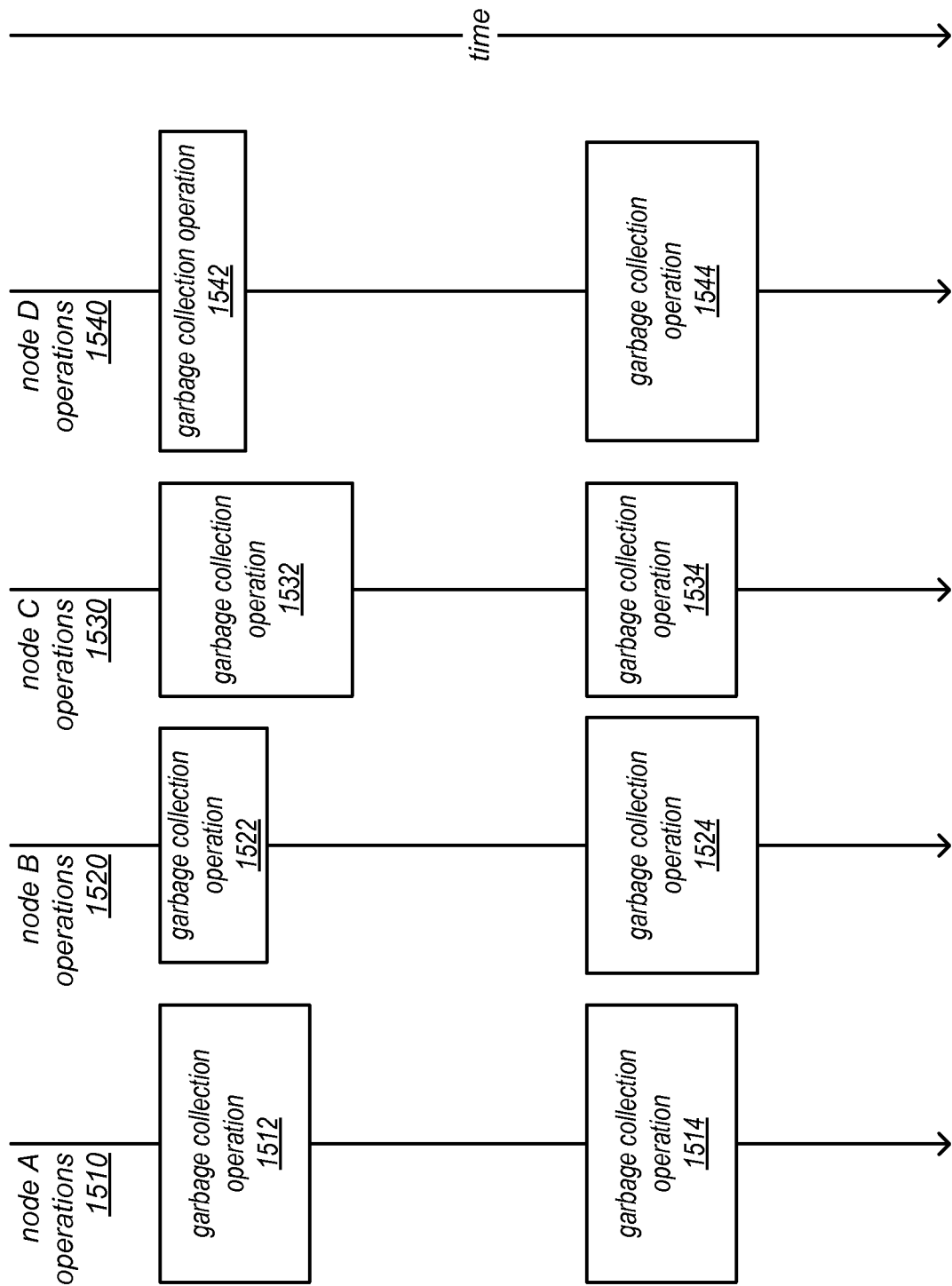
FIG. 15 is a block diagram illustrating a "stop the world everywhere" approach for implementing coordinated garbage collection, according to one embodiment.

FIG. 15 is a block diagram illustrating a "stop the world everywhere" technique for implementing coordinated garbage collection, according to one embodiment. In this example, the system (or a garbage collection coordinator thereof) is configured to synchronize the start of garbage collection across the nodes in the system such that they all perform (or at least begin to perform) garbage collection at (essentially) the same time. In this example, the operations of four nodes (node A, node B, node C, and node D) are illustrated on timelines 1510, 1520, 1530, and 1540, respectively, and each node performs two garbage collection operations. For example, timeline 1510 illustrates that node A performs a garbage collection operation 1512 and a garbage collection 1514. Similarly, timeline 1520 illustrates that node B performs a garbage collection operation 1522 and a garbage collection 1524; timeline 1530 illustrates that node C performs a garbage collection operation 1532 and a garbage collection 1534; timeline 1540 illustrates that node D performs a garbage collection operation 1542 and a garbage collection 1544. In this example, garbage collection operations 1512 (on node A), 1522 (on node B), 1532 (on node C), and 1542 (on node D) begin at substantially the same time, although they do not all take the same amount of time. Similarly, garbage collection operations 1514 (on node A), 1524 (on node B), 1534 (on node C), and 1544 (on node D) begin at substantially the same time, but do not all take the same amount of time.

As described in detail herein, the initiation of garbage collection operations on all of the nodes in a distributed system (e.g., nodes A, B, C, and D described above) may be performed in different ways, in different embodiments. For example, in various embodiments, a message indicating that collection should commence on all of the nodes may be broadcast at the start of a collection on any one node by a node that has been selected or designated as a leader (e.g., using a leader election protocol), may be sent from any node on which a garbage collection trigger condition has been met to a leader that then resends the message to the other nodes, or may be sent from any node on which a garbage collection trigger condition has been met directly to the other nodes. Such a message may trigger collection on all of the nodes at (essentially) the same time in response to at least one of them meeting a garbage collection trigger. Note, however, that in some embodiments, this trigger may, optionally, be subject to a threshold, e.g., if heap occupancies or allocation rates are mismatched.

Figure 16:
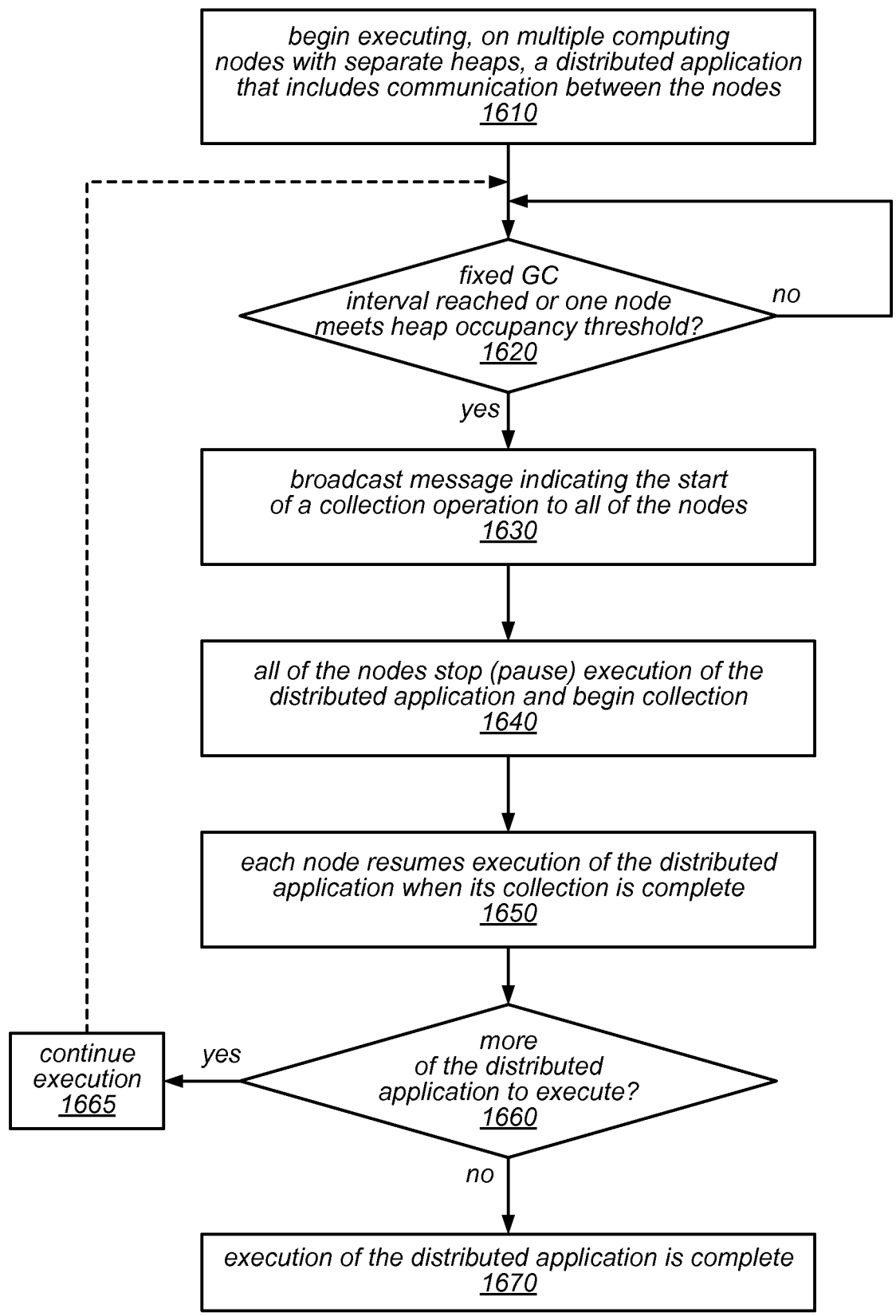
FIG. 16 is a flow diagram illustrating one embodiment of a method for synchronizing the start of collection across all nodes in a system under a "stop the world everywhere" approach for implementing coordinated garbage collection.

One embodiment of a method for synchronizing the start of collection across all nodes in a distributed system under a "stop the world everywhere" approach for implementing coordinated garbage collection is illustrated by the flow diagram in FIG. 16. As illustrated at 1610, in this example, the method may include beginning execution, on multiple virtual machines (VMs), each of which has its own separate heap, of a distributed application that includes communication between the virtual machine instances. In some embodiments, the virtual machine instances may be implemented in a garbage collected programming language. In this example, the method may include continuing execution of the distributed application on the multiple virtual machine instances until or unless a determination is made to perform a collection operation on one or more of the virtual machine instances. For example, in various embodiments, a centralized monitor process or a monitor process on each of the nodes may gather readiness state information and/or heap occupancy data and/or may provide that information to a centralized garbage collection coordinator and/or to other nodes (e.g., to a garbage collection coordinator component on, or associated with, each of the virtual machine instances on which the distributed application is executing). In the example illustrated in FIG. 16, execution of the distributed application may continue normally until and unless a fixed garbage collection interval is reached or until one node (e.g., at least one of the virtual machine instances on which the distributed application is executing) meets a predetermined maximum heap occupancy threshold. This is illustrated in FIG. 16 by the feedback from the negative exit of 1620 to its input.

As illustrated in FIG. 16, if and when the fixed garbage collection interval is reached or until one node (e.g., at least one of the virtual machine instances on which the distributed application is executing) meets the predetermined maximum heap occupancy threshold, shown as the positive exit from 1620, the method may include broadcasting a message indicating the start of a collection operation to all of the nodes (e.g., all of the virtual machine instances on which the distributed application is executing), as in 1630. For example, in some embodiments, in response to reaching the predetermined maximum heap occupancy threshold, a node that reached the predetermined maximum heap occupancy threshold may notify a centralized garbage collection coordinator process or a node that was elected leader (or that is otherwise designated to serve as a garbage collection coordinator for the virtual machine instances on which the distributed application is executing). In this example, the centralized garbage collection coordinator may broadcast or resend that notification message to other nodes, in order to initiate a garbage collection operation on all of the virtual machine instances on which the distributed application is executing at approximately (substantially) the same time. In another example, a centralized or designated garbage collection coordinator may determine (based, at least in part, on readiness state information or heap occupancy information received from the virtual machine instances on which the distributed application is executing) that a collection operation should be performed on all of the virtual machine instances on which the distributed application is executing, and may broadcast a notification to that effect, thus initiating a collection on all of the virtual machine instances at substantially the same time. In yet another example, a node that reaches a predetermined maximum heap occupancy threshold may, itself, broadcast a message to all of the virtual machine instances on which the distributed application is executing (e.g., in embodiments that do not include a centralized or designated garbage collection coordinator) in order to trigger a collection on all of the virtual machine instances at substantially the same time.

As illustrated in FIG. 16, the method may include all of the nodes stopping (or pausing) execution of the distributed application and beginning a collection, as in 1640. In this example, each node may resume execution of the distributed application when its collection is complete, as in 1650. Note, however, that in some embodiments, communication between any pair of nodes as part of the execution of the distributed application may not be able to take place until both of the nodes in the pair have completed collection and resumed execution of the distributed application. Therefore, if collection takes longer on some of the nodes than on other ones of the nodes, there may still be some delays in the execution of the distributed application. However, the number and/or duration of any such delays is likely to be reduced (and the overall performance of the distributed application will likely be improved) when compared to execution of the distributed application in a system that do not implement coordinated garbage collection.

In this example, while there is more of the distributed application to execute, shown as the positive exit from 1660, execution may continue, as in 1665. Note that, during continued execution of the distributed application, some or all of the operations illustrated in 1620 to 1660 may be repeated as necessary (e.g., if conditions warrant the invocation of another synchronized collection operation). This is illustrated in FIG. 16 by the dashed line from 1665 to 1620. If, or once, there is nothing left of the distributed application to execute, shown as the negative exit from 1660, the execution of the distributed application may be complete, as in 1670.

A "staggered garbage collections" policy (applied as part of coordinated garbage collection) may aim for a bounded number of nodes collecting at any time. In some embodiments, leader election may be used to select a dedicated coordinator node from among the machines in the distributed system (e.g., a node on which a garbage collection coordinator process is running) that tracks and controls which, and how many, nodes are performing collection at any one time. In some embodiments, the coordinator node may hold a number of "stopped node" tokens, which may be needed in order to perform collection and which may requested by a node prior to beginning collection (i.e., in advance of needing to stop execution of a distributed application in order to perform a major or minor collection). The coordinator node may also track nodes that are waiting for tokens. For example, when a machine reaches a predetermined heap occupancy, it may request one of the "stopped node" tokens from the coordinator. The Coordinator may immediately supply a token (if there is one available), or may supply a token once one that was previously taken by another machine has been relinquished. In other embodiments, the work of a garbage collection coordinator process may be distributed across the machines in the system, rather than being performed by a dedicated garbage collection coordinator process running on a single one of the machines.

Figure 17:
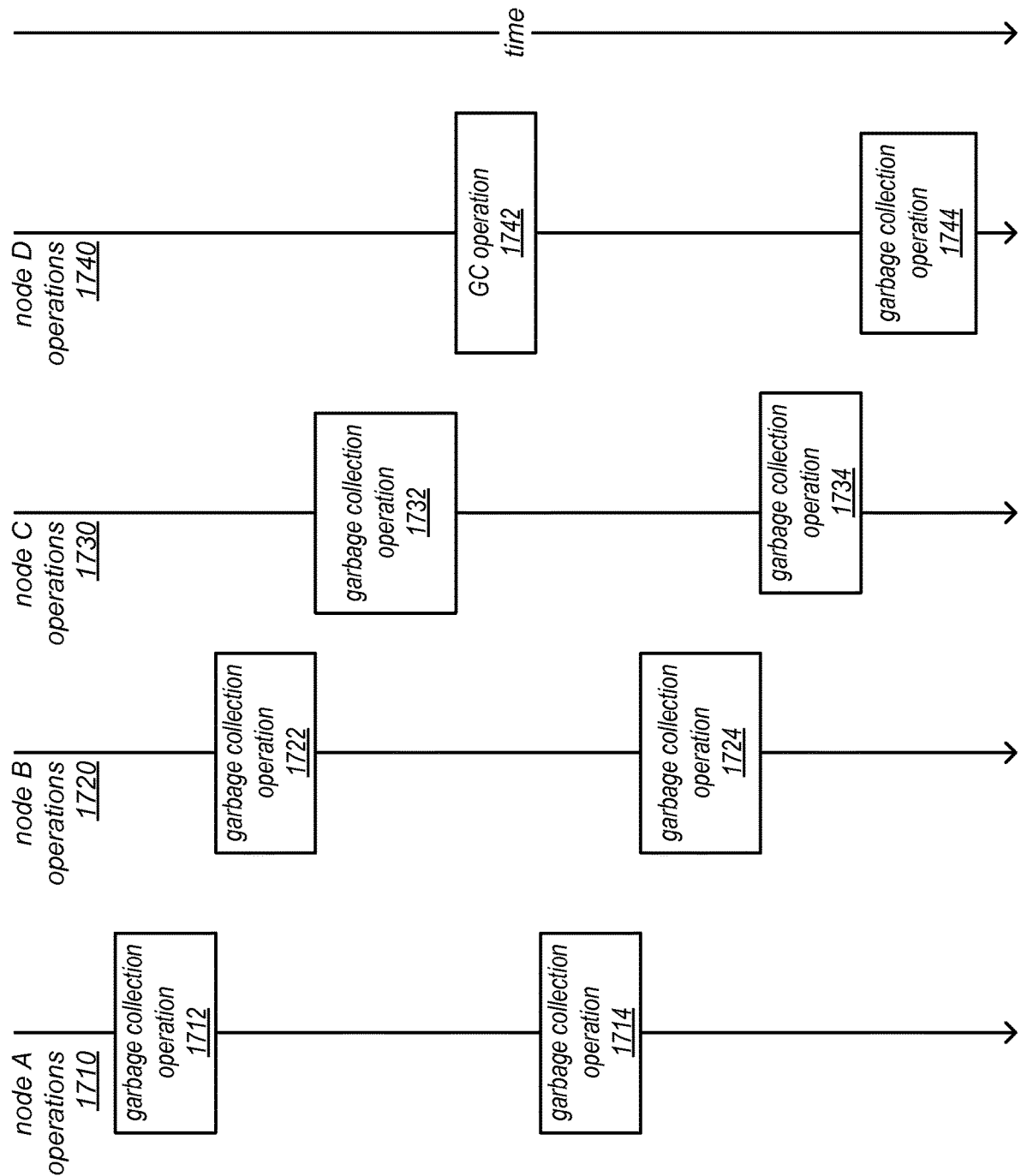
FIG. 17 is a block diagram illustrating a "staggered garbage collections" approach for implementing coordinated garbage collection, according to one embodiment.

FIG. 17 is a block diagram illustrating an example "staggered garbage collections" technique for implementing coordinated garbage collection, according to one embodiment. In this example, the system (or a garbage collection coordinator thereof) is configured to stagger garbage collection operations across the nodes in the system such that only one of the nodes performs garbage collection at a time. In other embodiments, the system (or a garbage collection coordinator thereof) may be configured to stagger garbage collection operations across the nodes in the system in order to enforce a predetermined upper bound on the number of nodes performing garbage collection at (essentially) the same time (e.g., a limit of two or three nodes, or more, in some embodiments).

In FIG. 17, the operations of four nodes (node A, node B, node C, and node D) are illustrated on timelines 1710, 1720, 1730, and 1740, respectively, and each node performs two garbage collection operations. For example, timeline 1710 illustrates that node A performs a garbage collection operation 1712 and a garbage collection 1714. Similarly, timeline 1720 illustrates that node B performs a garbage collection operation 1722 and a garbage collection 1724; timeline 1730 illustrates that node C performs a garbage collection operation 1732 and a garbage collection 1734; timeline 1740 illustrates that node D performs a garbage collection operation 1742 and a garbage collection 1744. However, unlike in the example illustrated in FIG. 15, garbage collection operations 1712 (on node A), 1722 (on node B), 1732 (on node C), and 1742 (on node D) are staggered such that only one node is performing garbage collection at a time. Similarly, garbage collection operations 1714 (on node A), 1724 (on node B), 1734 (on node C), and 1744 (on node D) are performed one at a time after garbage collection operations 1712 (on node A), 1722 (on node B), 1732 (on node C), and 1742 (on node D) have been completed.

In some embodiments that employ the use of tokens in coordinating garbage collection across the nodes of a distributed system, the total number of tokens may be dependent on the number of machines, the type of workload, the tolerance for how many can be stopped at a time, or other criteria. In some embodiments (including in some embodiments that implement a Cassandra data management system), there may be an application-specific minimum number of machines that need to be active to be able to respond to a request (e.g., to make a quorum). In a specific example, in a system that implements three-way replication of data, the system is able to support a read request as long as at least one of the replicas is not stopped for garbage collection, and is able to support an update request as long as no two of them are stopped, and these constraints may be used to determine the number of tokens that it is safe to provide. For example, if young generation garbage collection takes one millisecond and takes places every 100 milliseconds (or every second or so), then a lot of the time there may not be any machines collecting. In this case, having only a single token may not only be a simple approach, but may also be perfectly acceptable. In some embodiments, a garbage collection may be triggered on one or more machines when tokens become available even though a garbage collection is not immediately necessary at that time. In this case, proactively triggering an additional collection on one or more machines may eliminate or mitigate the likelihood of requiring garbage collection on those machines at a future time when tokens are not available. In some embodiments, the rate of these additional collections may be limited to control their impact on the performance of the distributed system. For example, in one embodiment, if a young generation collection typically takes place every 100 milliseconds, then an additional collection may be triggered at most once every 80 milliseconds.

Figure 18:
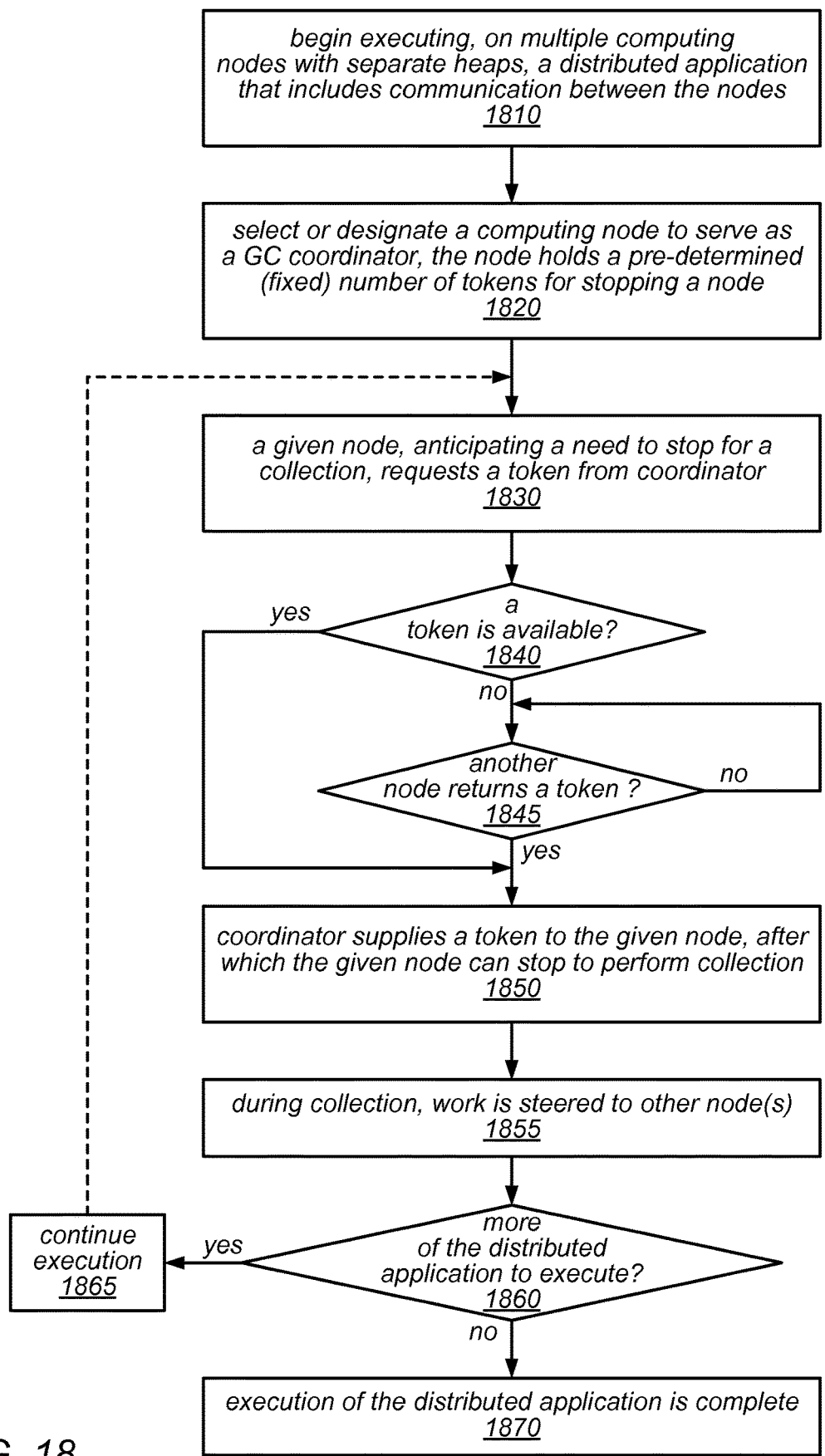
FIG. 18 is a flow diagram illustrating one embodiment of a method for implementing GC-aware work distribution that includes deliberately staggering collections across nodes.

FIG. 18 is a flow diagram illustrating one embodiment of a method for implementing GC-aware work distribution that includes deliberately staggering collection operations across nodes (e.g., by placing and enforcing an upper bound on the number of nodes that are collecting at any given time). As illustrated at 1810, in this example, the method may include beginning execution, on multiple computing nodes (e.g., on multiple virtual machine instances, each running on a respective computing node), each of which has its own separate heap, of a distributed application that includes communication between the virtual machine instances. In some embodiments, the virtual machine instances may be implemented in a garbage collected programming language. As illustrated in this example, the method may include selecting (e.g., using leader election) or otherwise designating a computing node to serve as a garbage collection coordinator for the virtual machine instances on which the distributed application is executing, and this computing node may hold a pre-determined (fixed) number of tokens for stopping a node, as in 1820. In other words, the garbage collection coordinator may employ a fixed pool of tokens in limiting the number of nodes that can perform a collection at the same time (e.g., the number of tokens may be equal to, or dependent on, the number of nodes that can perform a collection at a time, which may be as few as one or two nodes). In some embodiments, the number of tokens may be dependent on the number of non-collecting nodes that are required to meet a quorum for various operations of the distributed application, or to perform system-level operations.

As illustrated in FIG. 18, the method may, at some point, include a given node, anticipating a need to stop for garbage collection, requesting a token from the garbage collection coordinator, as in 1830. Note that, in various embodiments, the garbage collection coordinator may be a single, centralized process that executes on its own computing node (or its own virtual machine hosted on one of the computing nodes) or on one of the computing nodes on which the distributed application is executing (e.g., a node that was selected to perform the functions of the garbage collection coordinator). If there are no tokens available (e.g., if all of the tokens in the pool have already been requested by, and granted to, other nodes that needed to stop execution of the distributed application in order to perform a collection), shown as the negative exit from 1840, the method may include waiting until one of the other nodes returns a token. This is illustrated in FIG. 18 by the feedback from the negative exit of 1845 to its input. If a token is available (shown as the positive exit from 1840), or once another token has been returned (shown as the positive exit from 1845), the method may include the coordinator supplying a token to the given node, after which the given node can stop to perform collection immediately or when it is ready to do so, as in 1850.

As illustrated at 1855, in this example, during collection by the given node, work that is directed to the given node may be steered to one or more other nodes. In one example, while the given node is performing a collection, read or update operations of a distributed database application that target data maintained on the given node may be steered to other nodes that maintain the same data.

In this example, while there is more of the distributed application to execute, shown as the positive exit from 1860, execution may continue, as in 1865. Note that, during continued execution of the distributed application, some or all of the operations illustrated in 1830 to 1860 may be repeated as necessary (e.g., if conditions warrant the invocation of another collection operation on one of the nodes). This is illustrated in FIG. 18 by the dashed line from 1865 to 1830. If, or once, there is nothing left of the distributed application to execute, shown as the negative exit from 1860, the execution of the distributed application may be complete, as in 1870.

Note that while the example illustrated in FIG. 18 includes a garbage collection coordinator that is a single, centralized process that executes on its own computing node (or its own virtual machine hosted on one of the computing nodes) or on one of the computing nodes on which the distributed application is executing (e.g., a node that was selected to perform the functions of the garbage collection coordinator), in other embodiments, the functions of the garbage collection coordinator may be distributed among the computing nodes (and virtual machine instances hosted thereon). For example, in one embodiment, when a node anticipates needing to stop for a collection, it may notify the other nodes on which the distributed application is executing, and each of the nodes may increase a count of the number of nodes that are performing (or about to perform) a collection that is maintained on the node. The nodes may also notify each other when they complete a collection, after which the count on each node may be decreased. In this example, each node may refrain from performing a collection (and/or notifying the other nodes of its intent to perform a collection) if the count has reached a predetermined upper bound on the number of nodes that can perform a collection operation at the same time. In this example, nodes may perform a collection only if the count is below the predetermined upper bound. If it is not, a node wishing to perform a collection may need to wait for the count to fall below the predetermined upper bound before attempting to perform a collection.

Figure 19:
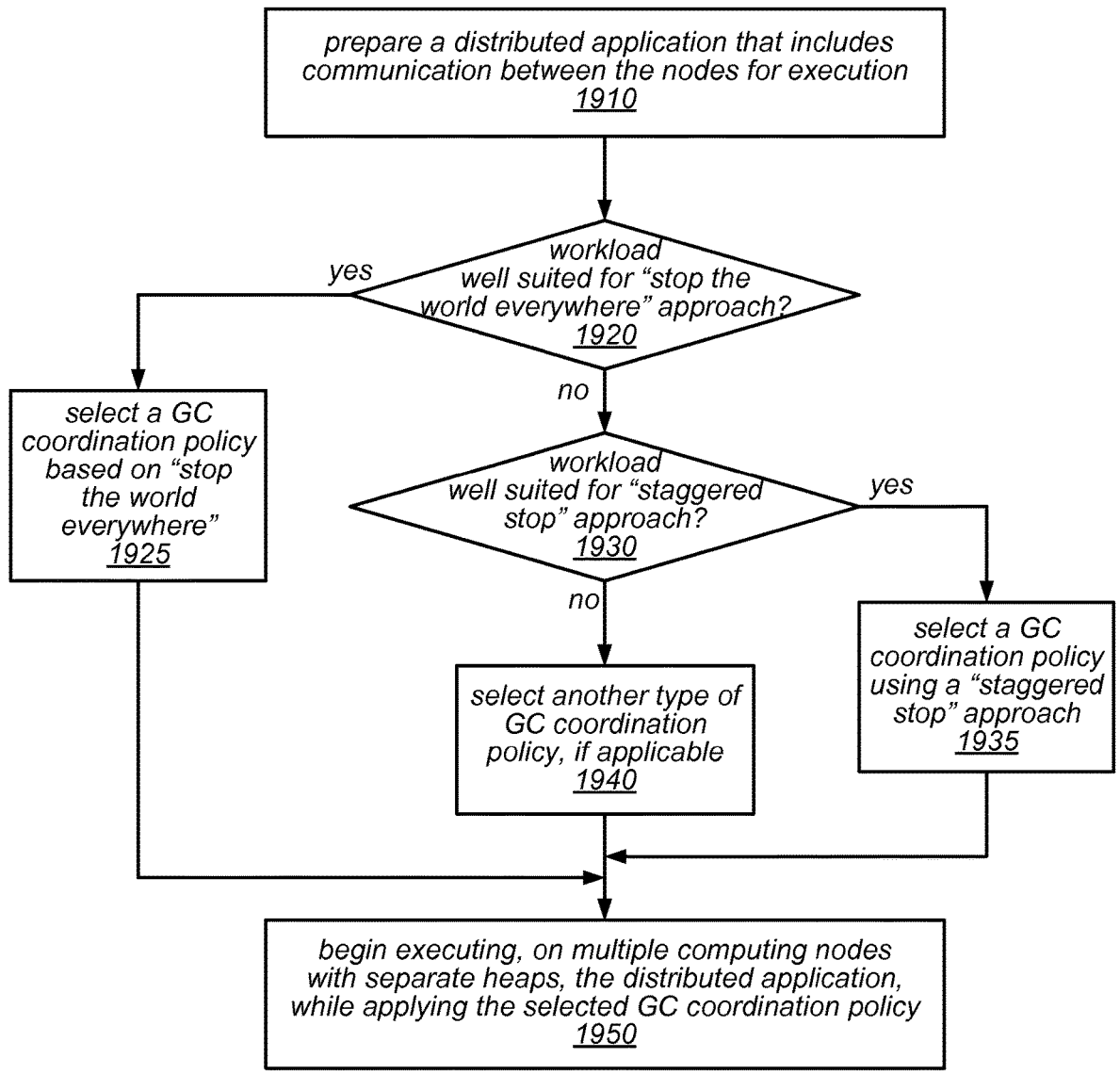
FIG. 19 is a flow diagram illustrating one embodiment of a method for selecting a garbage collection coordination policy from among multiple garbage collection coordination policies that are supported in a single system.

As noted above, in some embodiments, any number of different general-purpose garbage collection policies may be provided by the system (e.g., by the GC Coordinator, the cluster nodes, and/or an underlying operating system) and selected for use under different circumstances. FIG. 19 is a flow diagram illustrating one embodiment of a method for selecting a garbage collection coordination policy from among multiple garbage collection coordination policies that are supported in a single system (including, for example, one or more policies that implement a "stop the world everywhere" approach and one or more policies that implement a "staggered stop" approach). As illustrated at 1910, in this example, the method may include preparing a distributed application that includes communication between the nodes on which it runs for execution. For example, the method may include writing, modifying, and/or instrumenting the distributed application so that it calls functions of (or links to) a GC-aware communication library, such as that described herein.

As illustrated in this example, if the workload of the distributed application would likely benefit from a "stop the world everywhere" type garbage collection coordination approach, shown as the positive exit from 1920, the method may include selecting a garbage collection coordination policy based on a "stop the world everywhere" approach, as in 1925. For example, long-running computations executing on multiple machines that communicate with each other (including, but not limited to, batch-mode applications where throughput is a main concern) may benefit from a garbage collection coordination approach that synchronizes collections across multiple nodes at a pre-defined (e.g., fixed, configurable, or dynamically changeable) garbage collection interval or when any of the nodes meets a pre-defined garbage collection trigger condition (such as a fixed, configurable, or dynamically changeable maximum heap occupancy threshold).

On the other hand, if the workload would likely benefit from a "staggered stop" approach (e.g., one that may be used to implement GC-aware work distribution by deliberately staggering collection across nodes (e.g., by enforcing an upper bound on the number of nodes that are collecting at any given time), shown as the positive exit from 1930, the method may include selecting a garbage collection coordination policy that applies a "staggered stop" approach, as in 1935. For example, applications in which the latency of individual requests is more important (e.g., to the client) than the overall throughput of the server may benefit from a garbage coordination approach that limits the number of stopped nodes at a time. In some embodiments, selecting a garbage collection coordination policy that applies a "staggered stop" approach may include determining the number of tokens that will be held by a centralized or distributed coordinator process, as described herein.

As illustrated in this example, if the workload of the distributed application is not particularly well suited for the application of a "stop the world everywhere" approach or a "staggered stop" approach, such as those described herein, the method may include selecting another type of garbage collection coordination policy, assuming that another type of policy is supported in the system and is applicable to the workload of the distributed application, as in 1940. As illustrated in FIG. 19, in any of these cases, the method may include begin executing the distributed application, on multiple computing nodes, each of which has (or is associated with) a separate heap, while applying the selected garbage collection coordination policy, as in 1950. Note that beginning execution may include the nodes electing a leader to serve as a garbage collection coordinator, in some embodiments. Note also that executing the distributed application may in some embodiments include invoking functions of a GC-aware communication library, and these functions may manage the coordination of collections (whether or not the coordination is performed by a single, centralized garbage collection coordinator or using a distributed garbage collection coordination process).

In some embodiments, the systems described herein may expose an API that allows nodes to communicate their stopped or non-stopped status. For example, in some embodiments, each of the nodes may be able to invoke an operation (in accordance with the API) to broadcast their stopped or non-stopped status to all of the other nodes in the distributed system. In other embodiments, each of the nodes may invoke an operation (in accordance with the API) to inform a garbage collection coordinator process of its stopped or non-stopped status and/or operations to query the garbage collection coordinator process to determine the stopped or non-stopped status of the other nodes in the distributed system.

Note that the techniques for coordinating the stopping or pausing of execution on various nodes of a distributed system are described herein primarily in terms of their use in performing coordinated garbage collection, which was a motivating use case. However, in other embodiments, the same approaches may be applied to coordinate the stopping or pausing of execution on various nodes of a distributed system when there are other reasons for nodes to stop or pause, or to coordinate other activities that, when performed on one of the computing nodes may delay operations on other computing nodes. For example, in some embodiments, one or more nodes may need to pause in order to perform just-in-time compilation, to perform some type of housekeeping activity within the application, or to perform some type of systems operation (such as migrating data or execution from one machine to a different machine). In such embodiments, the techniques described herein may be used to allow a central coordinator process, or the nodes of a distributed system themselves, to determine when, if, and/or how many nodes are stopped during execution of an application in the distributed system. In other words, these techniques may be applied in any context in which it may be useful to inform other nodes in a distributed system that a given node is stopped/paused (or is about to stop/pause) and/or to coordinate and control the stops/pauses that need to occur on the nodes in a distributed system.

Figure 20:
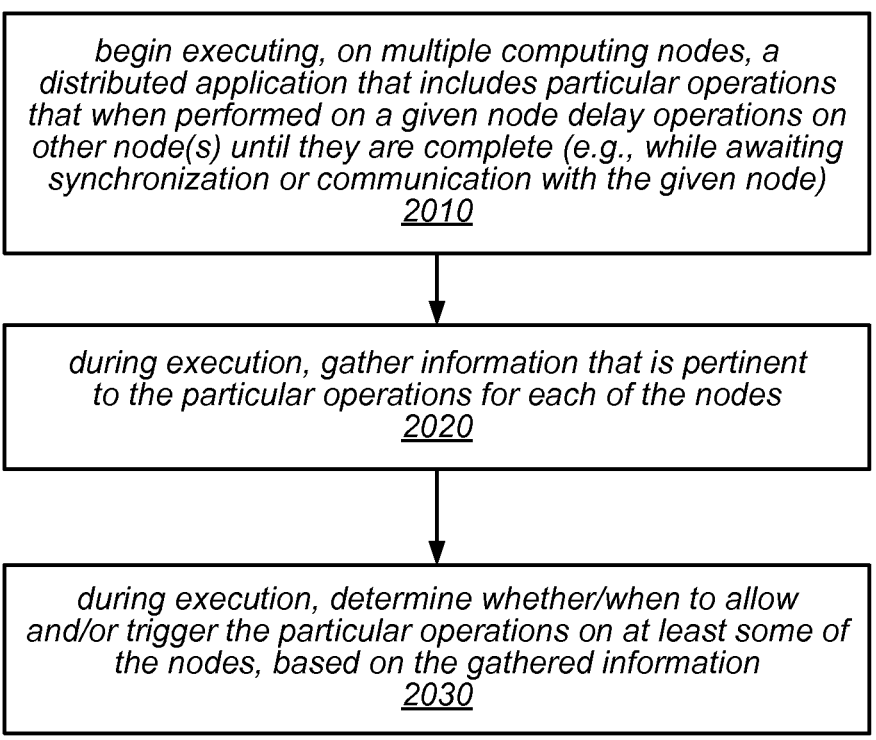
FIG. 20 is a flow diagram illustrating one embodiment of a method for coordinating the execution of particular operations that are performed when executing a distributed application on multiple computing nodes.

FIG. 20 is a flow diagram illustrating one embodiment of a method for method for coordinating the execution of particular operations that are performed when executing a distributed application on multiple computing nodes (e.g., operations that, when performed on one of the computing nodes may delay operations on other computing nodes). As illustrated at 2010, in this example, the method may include beginning execution, on multiple computing nodes, of a distributed application that includes particular operations that when performed on a given computing node delay operations on one or more other computing nodes until they are complete (e.g., while awaiting synchronization or communication with the given computing node). For example, in some embodiments, the method may be applied when executing a distributed application that performs (or needs to be paused or stopped to perform) a housekeeping activity or another type of activity on one or more of the nodes. In another example, the method may be applied when executing a distributed application in which the computing nodes communicate with each other or need to synchronize with each other from time to time. In yet another example, the method may be applied when executing a distributed application that performs one or more operations that can only be executed on one computing node (or on a limited number of computing nodes) at a time. In some embodiments, the distributed application may run on a virtual machine instances that are hosted on respective ones of the computing nodes.

As illustrated in FIG. 20, the method may include, during execution, gathering information that is pertinent to the particular operations for each of the computing nodes, as in 2020. For example, in some embodiments, a monitoring operation on each of the computing nodes or a centralized monitoring operation may gather information usable to determine whether and/or when to perform one of the particular operations on one or more of the nodes, such as information usable to detect a trigger condition for allowing (or prohibiting) the performance of one of the particular operations on one or more of the computing nodes.

The method may also include, during execution, determining whether and/or when to allow and/or trigger the performance of any of the particular operations on at least some of the nodes, based on the gathered information, as in 2030. For example, in various embodiments, the determination and/or triggering of the particular operations may be performed by coordinator operations on each node or by a centralized coordinator process. In various embodiments, the determination and/or triggering of the particular operations may be dependent on whether one of the particular operations is being performed (or is about to be performed) on other ones of the computing nodes (or on one or more virtual machine instances hosted thereon), the number of computing nodes that are allowed to perform one of the particular operations at substantially the same time, or other criteria.

In some embodiments, a coordinated garbage collection API (sometimes referred to herein as a GC API) may be exposed that allows software on one node to query whether or not another node is ready to receive messages, according to some embodiments. Such an API may, in some embodiments, be built over a low-latency interconnect. This ready/not-ready state may be updated by the system to indicate whether a thread will soon need to be stopped for collection (e.g., if its heap occupancy is approaching a predetermined threshold). In addition, the state may be updated by the application itself. (e.g., before performing a periodic housekeeping task), or by any long-latency kernel operations, according to various embodiments. Thus, a node may be temporarily marked as one that is considered not ready to receive messages for a variety of reasons, such as because it is about to pause for collection, because it is performing a house-keeping activity on the node and/or within the application, or, potentially, because other (long latency) operations (such as an interaction with the operating system, a pre-emption, or a live migration of a virtual machine instance) are being performed, or for other reasons, according to various embodiments.

Note that the emergence of a small number of popular frameworks for distributed application may mean that there is no need to modify each application in order to implement coordinated garbage collection. In other words, in some embodiments, it may be possible to implement the garbage collection techniques described herein without needing to modify to each individual application (e.g., due to the emergence of a number of common "big data" software stacks). In some embodiments, supporting coordinated garbage collection may instead require changes to a communication library. For example, in some embodiments, a distributed system framework (e.g., a Spark or Apache Hadoop framework) may not be built directly over a low-latency interconnect (such as InfiniBand, UDP or PDP), but may include some intermediate communication library that communicates over the low-latency interconnect. Therefore, the coordinated garbage collection techniques described herein may, in various embodiments, be implement by modifying such communication libraries without needing all of the software being built over these libraries to be changed. In some embodiments, an application's communication library may be modified or extended to use an exposed coordinated GC API to avoid communicating with nodes that are not ready to receive messages. For example, in one embodiment, an "anycast" send operation of the communication library may be modified so that the application allows the library to select the nodes with which it communicates (e.g., avoiding communicating with a node that is stopped or is about to be stopped, or that is otherwise not ready to receive messages).

Additionally, in some embodiments, status information (e.g., a ready/not ready state) may be exchanged between nodes in any of various ways. As noted above, each node may use a coordinated GC API to publish a ready/not ready state which may be visible to other nodes. In one embodiment, each node may push its state to other nodes, such as by using remote direct memory access (RDMA), assuming a suitably fast interconnect. Use of RDMA to distribute ready/not ready state may avoid interrupting other nodes, according to some embodiments. In other embodiments, nodes may broadcast or multi-cast status information. In still other embodiments, a leader may be used to distribute node status information. For example, an elected leader node (or the GC Coordinator) may receive status information from each node and may distribute that information (either when it is received or on demand) to the other nodes. Additionally, in some embodiments, status information updates may be rate-limited to limit their impact on the interconnect.

As noted above, coordination of garbage collection (e.g., coordinated garbage collection) across nodes may improve the performance distributed applications (e.g., both batch-mode applications where throughput is a main concern, and interactive applications, where request latencies are a main concern), according to various embodiments.

In some embodiments, coordinated garbage collection may only coordinate major garbage collection cycles, but in other embodiments, minor collections (or all collections) may be coordinated using coordinated garbage collection. For instance, in one embodiment, coordinated garbage collection may determine whether or not to coordinate minor collections based on whether each node has sufficient work for it to tolerate minor collections without stalling.

In some embodiments, a G1 collector may be utilized as part of coordinated garbage collection. For example, a GC Coordinator may be configured to dynamically set G1 pause time targets as a trade-off between throughput and application performance.

In some embodiments, coordinated garbage collection may involve an incremental garbage collection algorithm. For example, in one embodiment, an iterative algorithm may perform useful work on one node while another node is in a garbage collection pause and may finish that work before the other node completes the pause. In other words, if there is a known window of time to perform useful work on a particular node (e.g. while another node is in a garbage collection pause), an iterative algorithm may be configured to perform work on the particular node during this time that it knows it can finish before the other node completes its pause. In yet other embodiments, coordinated garbage collection may involve interrupting a garbage collection, such as to allow other, higher priority, work to complete before resuming the collection.

While described wherein mainly in terms of Java based applications and systems, in some embodiments, coordinated garbage collection may also be implemented using systems and/or applications developed using other development languages, such as C or C++. In addition, the techniques described herein may be applicable for coordinating other activities of a distributed system or for coordinated management of resources other than a garbage collected heap, in other embodiments. In still other embodiments, these techniques may be used to improve performance in systems that implement other garbage collection configurations (including, but not limited to, single-machine garbage collection configurations).

Figure 21:
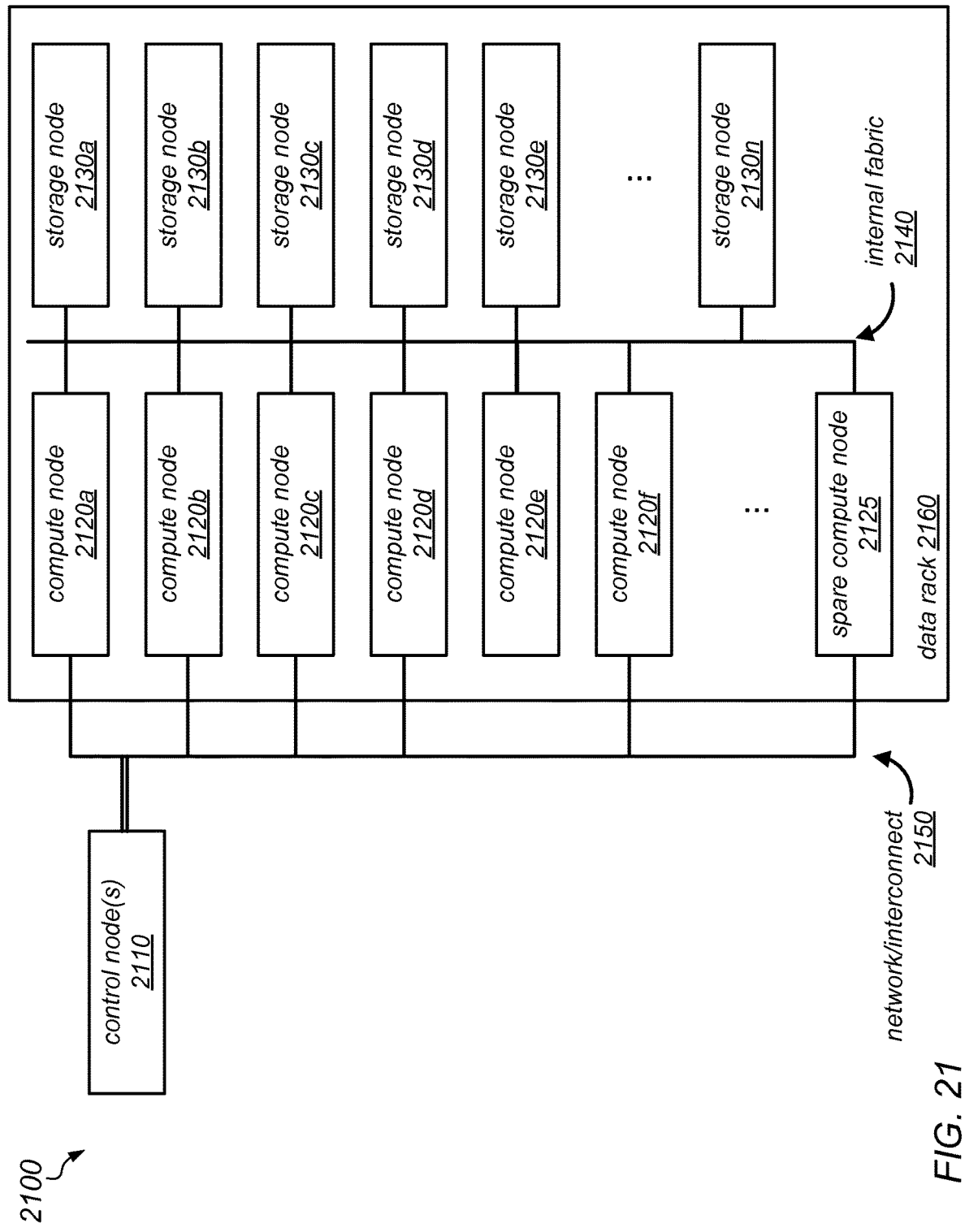
FIG. 21 is a block diagram illustrating one embodiment of a rack-scale system configured to implement coordinated garbage collection, according to one embodiment.

As noted above, in various embodiments coordinated garbage collection may be implemented in different types of systems, including across nodes in a rack-scale machine, such the example rack-scale system 2100 illustrated in FIG. 21. As shown in FIG. 21, a rack-scale system 2100 may include multiple compute nodes (shown and compute nodes 2120a-2120f and spare compute node 2125) and multiple data nodes (shown as storage nodes 2130a-2130n) that are connected to each other via one or more networks or data buses (such as internal fabric 2140 and/or network/interconnect 2150), one of which may be a low-latency interconnect on which messages may be exchanged between various nodes of the distributed system, as described herein. Note that in other embodiments, the system may include a single interconnect network, rather than including an internal fabric 2140 that is distinct from an external network/interconnect 2150, and/or a control node 2110 may be implemented as software running on one of the compute nodes (rather than on an external machine). In one embodiment, a rack-scale system 2100 may include two physical racks: a data rack (such as data rack 2160 illustrated in FIG. 21) and a control rack. In other embodiments, a rack-scale system may include two kinds of systems in the same rack, rather than in separate racks. A data rack may include multiple storage nodes 2130 and multiple compute nodes 2120 and/or 2125 coupled to each other via a data bus 2140, such as a Fibre Channel bus. A control rack may include multiple control nodes (such as multiple control nodes 2110) that are configured to provide (e.g., host) management of hardware and/or software and that may also manage requests (e.g., requests for service from one or more of the control nodes by a client of the system). The control rack and the data rack may be connected via a network or other interconnect, such as network/interconnect 2150, in some embodiments.

In some embodiments, each of the compute nodes and/or data nodes of the example system in FIG. 21 may be configured to implement coordinated garbage collection, as described herein. For example, each of the compute nodes (and/or data/storage nodes) may be configured to perform garbage collection in coordination with others of the nodes in the system. In some embodiments, a control node may function as a garbage collection coordinator (e.g., to monitor the state and/or status of the other nodes and trigger garbage collection cycles). In other embodiments, one of the control nodes (or one of the data nodes) may be nominated and/or elected as a leader node to perform the functions of a garbage collection coordinator. In yet other embodiments, the various nodes may communicate with each other to collectively implement coordinated garbage collection without the use of a specific garbage collection coordinator (e.g., without a single, centralized garbage collection coordinator component).

Example Computer System

Figure 22:
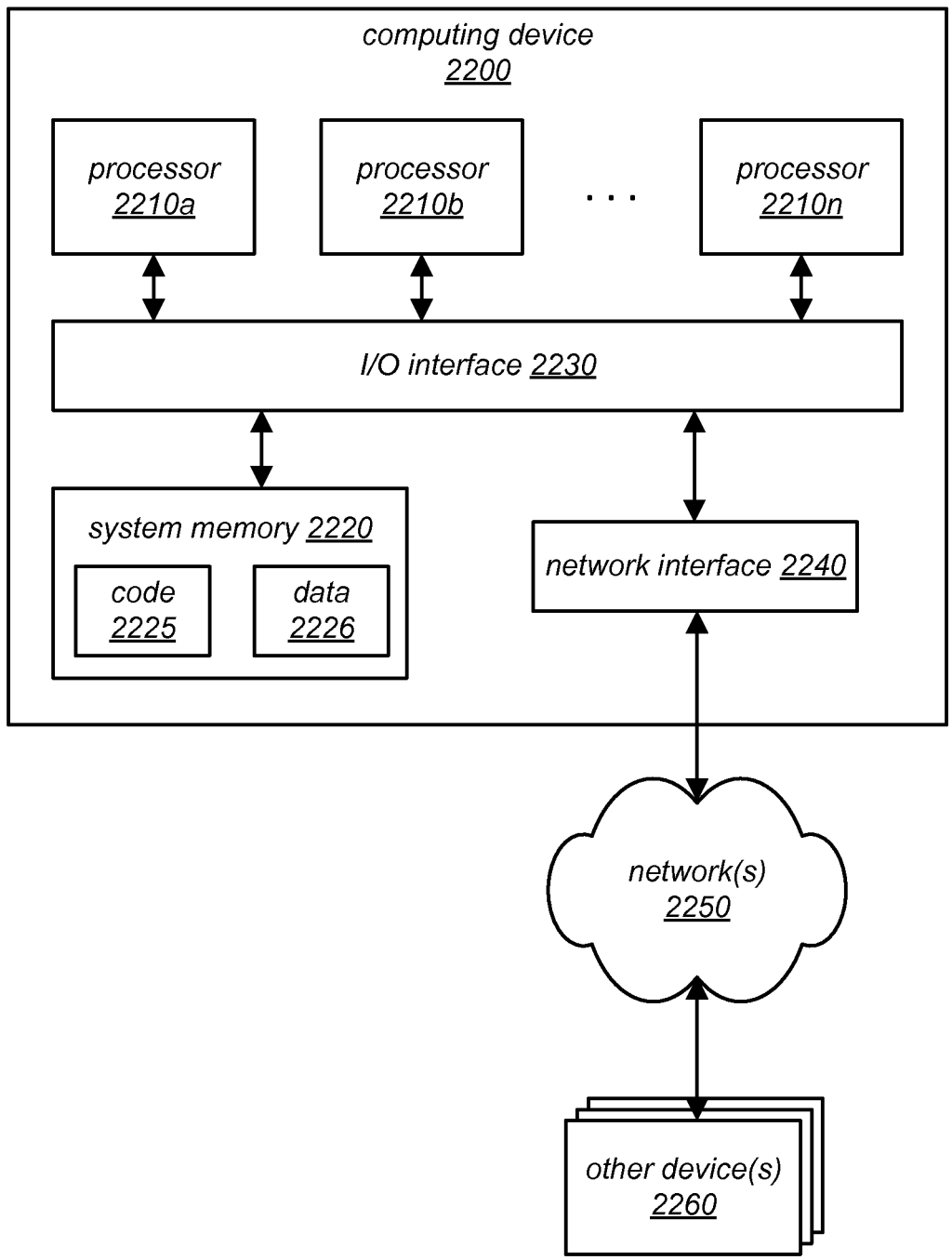
FIG. 22 is a block diagram illustrating a computing system configured to implement coordinated garbage collection, according to various embodiments.

In at least some embodiments, a computer system that implements a portion or all of one or more of the technologies described herein may include a computer system that includes or is configured to access one or more computer-readable media. FIG. 22 illustrates such a computing device 2200 suitable for implementing the garbage collection coordination methods, features and/or enhancements described herein. For example, computing device 2200 may be configured to host one or more virtual machine instances on which portions of a distributed application executes and on which garbage collection operations are coordinated with other computing devices (and/or virtual machine instances hosted thereon) that execute other portions of the distributed application. In the illustrated embodiment, computing device 2200 includes one or more processors 2210 (shown as 2210a-2210n) that are coupled to a system memory 2220 via an input/output (I/O) interface 2230. Computing device 2200 further includes a network interface 2240 coupled to I/O interface 2230.

In various embodiments, computing device 2200 may be a uniprocessor system including one processor 2210 or a multiprocessor system including several processors 2210 (e.g., two, four, eight, or another suitable number). Processors 2210 may include any suitable processors capable of executing instructions. For example, in various embodiments, processors 2210 may be general-purpose or embedded processors implementing any of a variety of instruction set architectures (ISAs), such as the x86, PowerPC, SPARC, or MIPS ISAs, or any other suitable ISA. In multiprocessor systems, each of processors 2210 may commonly, but not necessarily, implement the same ISA.

System memory 2220 may be configured to store program instructions and data accessible by processor(s) 2210. In various embodiments, system memory 2220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 2220 as code (i.e., program instructions) 2225 and data 2226. For example, memory 2220 as well as code 2225 and data 2226 may store, in one embodiment, program instructions and data for implementing a compiler, a virtual machine instance, a garbage collection coordinator, various GC-related APIs, and/or a GC-aware communication library, as described above. In various embodiments, data 2226 may include configuration parameters of one or more garbage collection coordination policies (e.g., parameters representing pre-determined occupancy thresholds or other garbage collection trigger conditions, garbage collection intervals, stopped-node tokens, the number of stopped node tokens, or other data usable in implementing a coordinated garbage collection policy) or for selecting a particular one of multiple garbage collection coordination policies that are supported in a distributed system.

In various embodiments, a compiler, a virtual machine instance, a garbage collection coordinator, and/or a GC-aware communication library (and/or any individual sub-modules thereof) used in implementing the techniques described may each be implemented using any of various programming languages or methods. For example, in one embodiment, code for implementing a compiler and/or virtual machine instance may be written in any of the C, C++, assembly, JAVA or other general-purpose programming languages, while in another embodiment, one or more of them may be written using a different, more specialized, programming language. Moreover, in some embodiments, a compiler, a virtual machine instance, a garbage collection coordinator, GC-related APIs, and/or a GC-aware communication library (and/or various sub-modules thereof) used in implementing the techniques described herein may not be implemented using the same programming language.

In one embodiment, I/O interface 2230 may be configured to coordinate I/O traffic between processor 2210, system memory 2220, and any peripheral devices in the device, including network interface 2240 or other peripheral interfaces. In some embodiments, I/O interface 2230 may perform any necessary protocol, timing or other data transformations to convert data signals from one component (e.g., system memory 2220) into a format suitable for use by another component (e.g., processor 2210). In some embodiments, I/O interface 2230 may include support for devices attached through various types of peripheral buses, such as a variant of the Peripheral Component Interconnect (PCI) bus standard or the Universal Serial Bus (USB) standard, for example. Also, in some embodiments some or all of the functionality of I/O interface 2230, such as an interface to system memory 2220, may be incorporated directly into processor 2210.

Network interface 2240 may be configured to allow data to be exchanged between computing device 2200 and other devices 2260 attached to a network or networks 2250, such as other computer systems or devices. In various embodiments, network interface 2240 may support communication via any suitable wired or wireless general data networks, such as types of Ethernet network, for example. In some embodiments, network interface 2240 may be a low-latency interface (e.g., an InfiniBand interconnect or another low-latency interface) over which multiple nodes of a distributed system (any or all of which may be implemented on a computing device similar to computing device 2200) communicate with each other.

In some embodiments, system memory 2220 may be one embodiment of a computer-readable (e.g., computer-accessible) medium configured to store program instructions and data, as described above, for implementing embodiments of garbage collection coordination methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 2200 via I/O interface 2230. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 2200 as system memory 2220 or another type of memory.

Further, a computer-readable medium may include transmission media or signals such as electrical, electromagnetic, or digital signals, conveyed via a communication medium such as a network and/or a wireless link, such as may be implemented via network interface 2240. Portions or all of multiple computing devices such as that illustrated in FIG. 22 may be used to implement the described functionality in various embodiments; for example, software components running on a variety of different devices and servers may collaborate to provide the described functionality. In some embodiments, portions of the described functionality may be implemented using storage devices, network devices, or special-purpose computer systems, in addition to or instead of being implemented using general-purpose computer systems. The term "computing device," as used herein, refers to at least all of these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions), in some embodiments.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by a garbage collection coordinator may, in some embodiments, be performed by another component and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
   a plurality of hardware computing nodes interconnected via a network, each of which comprises at least one processor and a memory, and each of which hosts one or more virtual machine instances, wherein each virtual machine instance has its own heap memory and garbage collector that are not shared with other virtual machine instances; and
   a garbage collection coordinator;
   wherein each of the virtual machine instances executes a respective process of a distributed application that communicates over the network with one or more other ones of the processes of the distributed application executing on respective other virtual machine instances, and wherein performing a garbage collection on one of the virtual machine instances hosted on a particular node of the plurality of computing nodes delays execution of one or more other of the virtual machine instances hosted on respective nodes of the plurality of computing nodes other than the particular node;
   wherein the garbage collection coordinator is configured to:
      receive information from at least one node of the plurality of hardware computing nodes indicating that the at least one node is not ready to receive communications from other ones of the processes of the distributed application;
      determine that a particular garbage collection should be performed on one of the virtual machine instances dependent, at least in part, on the received information; and
      initiate garbage collection on the one of the virtual machine instances.

2. The system of claim 1, wherein the determination that the particular garbage collection should be performed is further dependent on a pre-defined garbage collection policy.

3. The system of claim 2, wherein the pre-defined garbage collection policy specifies that all of the virtual machine instances hosted on the plurality of computing nodes should perform garbage collection at substantially the same time in response to a garbage collection trigger condition being met on at least one of the virtual machine instances.

4. The system of claim 2,
   wherein the pre-defined garbage collection policy specifies a predetermined fixed time interval between garbage collections or specifies a predetermined threshold amount or a predetermined threshold percentage for heap occupancy; and
   wherein to determine that a particular garbage collection should be performed on the one of the virtual machine instances, the garbage collection coordinator is configured to:
      determine that at least one of the virtual machine instances hosted on the plurality of computing nodes has not performed garbage collection in at least an amount of time equal to the predetermined fixed time interval; or
      determine that heap occupancy for at least one of the virtual machine instances hosted on the plurality of computing nodes meets or exceeds the predetermined threshold amount or predetermined threshold percentage for heap occupancy.

5. The system of claim 2, wherein the pre-defined garbage collection policy specifies or enforces a limit on the number of virtual machine instances that perform garbage collection at substantially the same time.

6. The system of claim 1, wherein the garbage collection coordinator comprises a single garbage collection coordinator component on one of the plurality of computing nodes.

7. The system of claim 1,
   wherein the garbage collection coordinator comprises a plurality of garbage collection coordinator components, each of which is associated with a respective virtual machine instance; and
   wherein each of the garbage collection coordinator components is a component of the one of the plurality of computing nodes on which the associated virtual machine instance is hosted.

8. The system of claim 1,
   wherein the system further comprises one or more monitor components;
   wherein each of the one or more monitor components is configured to send information to the garbage collection coordinator indicating the state of a process of the distributed application with respect to its readiness to receive communications from other ones of the processes of the distributed application executing on other virtual machine instances, wherein the state of a process of the distributed application indicates that it is not ready to receive communications from other ones of the processes of the distributed application when it is performing a garbage collection or has determined a need to perform a garbage collection; and wherein the determination that the particular garbage collection should be performed on the one of the virtual machine instances is further dependent on the state information of the respective processes of the distributed application that are executing on one of more of the virtual machine instances.

9. The system of claim 1,
wherein the system further comprises one or more monitor components; and
wherein each of the one or more monitor components is configured to send information to the garbage collection coordinator indicating a heap occupancy for a virtual machine instance hosted on one of the plurality of computing nodes; and
wherein the determination that the particular garbage collection should be performed on the one of the virtual machine instances is further dependent on the heap occupancy information.

10. A method, comprising:
performing, by a plurality of hardware computing nodes interconnected via a network:
   beginning execution of a distributed application, wherein respective processes of the distributed application executing on the plurality of hardware computing nodes communicate over the network with other processes of the distributed application executing on other ones of the plurality of hardware computing nodes, and wherein executing the distributed application comprises performing one or more particular operations that when performed on one of the plurality of computing nodes delays operations on one or more other ones of the plurality of computing nodes until it is complete;
   determining, during execution of the distributed application, that a given one of the plurality of computing nodes should perform one of the particular operations;
   receiving information from the given one of the plurality of computing nodes indicating that the given one of the plurality of computing nodes is not ready to receive communications from the other processes of the distributed application; and
   performing, by the given one of the plurality of computing nodes, the one of the particular operations;
   wherein said determining comprises applying a coordination policy that is dependent, at least in part, on the received information.

11. The method of claim 10, wherein the coordination policy is one of a plurality of application-dependent or workload-dependent policies from which it was selected for use in coordinating performance of the one or more particular operations on the plurality of computing nodes during execution of the distributed application.

12. The method of claim 10,
wherein said determining comprises determining that execution of the distributed application on one or more of the plurality of computing nodes should be paused or stopped to perform an activity initiated by a process of the distributed application itself or should be paused or stopped to perform an activity initiated by a process that is executing on one or more of the plurality of computing nodes other than a process of the distributed application.

13. The method of claim 10,
wherein the distributed application is an application that was written in a garbage collected programming language; and
wherein said determining comprises determining, by a garbage collection coordinator, that a major or minor garbage collection should be performed on the given one of the plurality of computing nodes and that execution of the distributed application on the given computing node should be paused or stopped while the garbage collection is performed.

14. The method of claim 13,
wherein executing the distributed application comprises a process of the distributed application executing on one of the plurality of computing nodes communicating with one or more processes of the distributed application that are executing on one or more other ones of the plurality of computing nodes;
wherein said communicating comprises:
   sending, to the one or more processes of the distributed application that are executing on one or more other ones of the plurality of computing nodes, information indicating that the computing node on which the process of the distributed application is performing, or is a determination has been made to perform, a garbage collection; or
   sending, to the one or more processes of the distributed application that are executing on one or more other ones of the plurality of computing nodes, information indicating a heap occupancy for one of the plurality of computing nodes; and
wherein said determining that a major or minor garbage collection should be performed on the given one of the plurality of computing nodes is dependent on said communicating.

15. The method of claim 10,
wherein the coordination policy specifies that all of the plurality of computing nodes should perform the one of the particular operations at substantially the same time in response to a trigger condition being met on one of the computing nodes;
wherein said determining that the given one of the plurality of computing nodes should perform the one of the particular operations comprises:
   a coordinator component determining that the trigger condition has been met on one of the plurality of computing nodes other than the given one;
   the coordinator component notifying one or more other ones of the plurality of computing nodes, including the given one of the computing nodes, that the computing node on which the trigger condition has been met is to perform the one of the particular operations; and
wherein the method further comprises, in response to receiving the notification, the given one of the plurality of computing nodes performing the one of the particular operations at substantially the same time as the computing node on which the trigger condition has been met.

16. The method of claim 10,
wherein the coordination policy enforces an upper bound on the number of computing nodes that can perform the one of the particular operations at substantially the same time;

wherein applying the coordination policy comprises:
   meeting, by the given one of the plurality of computing nodes, a trigger condition for performing the one of the particular operations on the given computing node;
   requesting, by the given computing node in response to meeting the trigger condition, a token from a pool of tokens managed by a distributed or centralized coordinator process, wherein the number of tokens in the pool is dependent on the number of computing nodes that can perform the one of the particular operations at substantially the same time according to the coordination policy;
   receiving, by the given computing node, an available token from the pool of tokens; and
   performing the one of the particular operations on the given computing node;
   meeting, by another one of the plurality of computing nodes while no tokens are available in the pool of tokens, a trigger condition for performing the one of the particular operations on the other computing node;
   requesting, by the other computing node in response to meeting the trigger condition, a token from the pool of tokens;
   waiting, by the other computing node, for a token to be returned the pool of tokens; and
   in response to a token being returned to the pool of tokens:
      receiving, by the other computing node a token from the pool of tokens; and
      performing the one of the particular operations on the other computing node.

17. A non-transitory, computer-readable storage medium storing program instructions that when executed on one or more computing nodes cause the one or more computing nodes to implement a garbage collection coordinator and an application programming interface for communication with the garbage collection coordinator;
   wherein the garbage collection coordinator is configured to:
      receive information from each of one or more of a plurality of computing nodes on which a respective process of a distributed application is executing, wherein the respective process of the distributed application executing on each of the plurality of computing nodes communicates with one or more other ones of the respective processes executing on other ones of the computing nodes, and wherein the respective processes of the distributed application executing on each of the plurality of computing nodes do not share heap memory; and
      initiate a garbage collection on at least one of the plurality of computing nodes dependent on the information;
   wherein the information is usable to determine whether or not the computing node is ready to receive communications from other ones of the processes of the distributed application;
   wherein the information is received via an operation defined by the application programming interface; and
   wherein the garbage collection coordinator is configured to initiate the garbage collection via an operation defined by the application programming interface.

18. The non-transitory, computer-readable storage medium of claim 17,
   wherein the information is received via an operation defined by the application programming interface that allows the plurality of computing nodes to share heap occupancy information with the garbage collection coordinator, an operation defined by the application programming interface that allows a computing node to publish state information indicating its readiness to perform garbage collection, an operation defined by the application programming interface that allows a computing node to publish state information indicating its readiness to receive communications from other ones of the plurality of computing nodes; or an operation defined by the application programming interface through which the garbage collection coordinator queries the one or more of the plurality of computing nodes for the information; and
   wherein the application programming interface further defines an operation through which the garbage collection coordinator initiates an expansion of heap memory on one of the plurality of computing nodes, or an operation through which the garbage collection coordinator initiates a contraction of heap memory on one of the plurality of computing nodes.

19. The non-transitory, computer-readable storage medium of claim 17,
   wherein the program instructions that when executed on the one or more computing nodes cause the one or more computing nodes to implement a communication library, operations of which are invoked by the respective processes of the distributed application executing on each of the plurality of computing nodes to communicate with each other;
   wherein the communication library encapsulates communications that are directed to the respective processes of the distributed application executing on each of the plurality of computing nodes in a manner that steers them to computing nodes that are ready to receive communications from other ones of the plurality of computing nodes or that steers them away from computing nodes that are performing, or have determined a need to perform, a garbage collection.

20. The non-transitory, computer-readable storage medium of claim 17,
   wherein the garbage collection coordinator is configured to initiate a garbage collection on all of the plurality of computing nodes in response to a determination that a garbage collection trigger condition has been met for at least one of the plurality of computing nodes;
   wherein to determine that a garbage collection trigger condition has been met, the garbage collection coordinator is configured to:
      determine an amount of time that has elapsed since the at least one of the computing nodes has performed a garbage collection and that the elapsed time is greater than a predetermined threshold amount of time; or
      determine that the at least one of the computing nodes has a current percentage of heap occupancy that exceeds a predetermined threshold for heap occupancy percentage; and
   wherein to initiate a garbage collection on all of the plurality of computing nodes, the garbage collection coordinator is configured to broadcast a message to all of the plurality of computing nodes indicating that a garbage collection is to be performed using an operation defined by the application programming interface.

* * * * *